US008805734B2

(12) United States Patent
Diana et al.

(10) Patent No.: US 8,805,734 B2
(45) Date of Patent: *Aug. 12, 2014

(54) AUTOMATED ATTACHMENT OF SEGMENTATION DATA TO HOT CONTACT LEADS FOR FACILITATING MATCHING OF LEADS TO INTERESTED LEAD BUYERS

(71) Applicant: LeadPoint, Inc., Los Angeles, CA (US)

(72) Inventors: Marc Diana, Santa Monica, CA (US); Per Pettersen, Los Angeles, CA (US)

(73) Assignee: LeadPoint, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,352

(22) Filed: Oct. 28, 2013

(65) Prior Publication Data

US 2014/0052496 A1 Feb. 20, 2014

Related U.S. Application Data

(60) Division of application No. 11/412,238, filed on Apr. 25, 2006, now Pat. No. 8,571,951, which is a continuation-in-part of application No. 11/207,571, filed on Aug. 19, 2005, now Pat. No. 7,970,690.

(60) Provisional application No. 60/674,268, filed on Apr. 23, 2005, provisional application No. 60/637,231, filed on Dec. 18, 2004, provisional application No. 60/610,470, filed on Sep. 15, 2004, provisional application No. 60/603,442, filed on Aug. 19, 2004.

(51) Int. Cl.
*G06Q 40/00* (2012.01)

(52) U.S. Cl.
USPC .......................................................... 705/37

(58) Field of Classification Search
CPC ........ G06Q 30/02; G06Q 40/04; G06Q 30/08

USPC .......................................................... 705/37
See application file for complete search history.

(56) References Cited

U.S. PATENT DOCUMENTS

| 4,757,267 A | 7/1988 | Riskin |
| 4,774,664 A | 9/1988 | Campbell et al. |

(Continued)

FOREIGN PATENT DOCUMENTS

EP 0840244 5/1998

OTHER PUBLICATIONS

WayBackMachine Mortgage homepage, Jan. 17, 1999, 1 page, http://replay.waybackmachine.org/19990117025241/http://www.chase.com:8009/noframes/mortgage-homepage.html.

(Continued)

*Primary Examiner* — Edward Baird
(74) *Attorney, Agent, or Firm* — Haynes and Boone, LLP

(57) ABSTRACT

In an automated leads-and-bids matching system, bid profiles are defined to describe desires of lead buyers. Received leads are matched to active ones of the bid profiles whose specifications the leads substantially match. Lead segmentation data is captured on-the-fly for example by inducing potential consumers to navigate their way through tree-organized web sites that categorize the consumers according to their geographic location, income/revenue range, class of products desired and/or other attributes. Live voice or other telecommunication connections to the pre-classified consumers are coupled to corresponding, pre-classified telecommunication nodes of a call processing system. The call processing system deduces the segmentation data of the consumers from the identities of the pre-classified nodes through which their connections pass. The deduced segmentation data is passed to an automated matching system or auctioning subsystem that finds the highest bids for each given lead.

10 Claims, 4 Drawing Sheets

(56) References Cited

U.S. PATENT DOCUMENTS

| | | | |
|---|---|---|---|
| 4,992,940 | A | 2/1991 | Dworkin |
| 5,218,539 | A | 6/1993 | Elphick et al. |
| 5,231,571 | A | 7/1993 | D'Agostino |
| 5,239,462 | A | 8/1993 | Jones et al. |
| 5,283,731 | A | 2/1994 | Lalonde et al. |
| 5,592,375 | A | 1/1997 | Salmon et al. |
| 5,611,052 | A | 3/1997 | Dykstra et al. |
| 5,664,115 | A | 9/1997 | Fraser |
| 5,671,279 | A | 9/1997 | Elgamal |
| 5,699,527 | A | 12/1997 | Davidson |
| 5,710,887 | A | 1/1998 | Chelliah et al. |
| 5,758,328 | A | 5/1998 | Giovannoli |
| 5,774,882 | A | 6/1998 | Keen et al. |
| 5,774,883 | A | 6/1998 | Andersen et al. |
| 5,794,207 | A | 8/1998 | Walker et al. |
| 5,794,219 | A | 8/1998 | Brown |
| 5,797,133 | A | 8/1998 | Jones et al. |
| 5,842,178 | A | 11/1998 | Giovannoli |
| 5,870,721 | A | 2/1999 | Norris |
| 5,875,437 | A | 2/1999 | Atkins |
| 5,878,403 | A | 3/1999 | DeFrancesco et al. |
| 5,913,202 | A | 6/1999 | Motoyama |
| 5,930,764 | A | 7/1999 | Melchione et al. |
| 5,937,391 | A | 8/1999 | Ikeda et al. |
| 5,940,807 | A | 8/1999 | Purcell |
| 5,940,811 | A | 8/1999 | Norris |
| 5,940,812 | A | 8/1999 | Tengel et al. |
| 5,946,665 | A | 8/1999 | Suzuki et al. |
| 5,966,699 | A | 10/1999 | Zandi |
| 5,966,700 | A | 10/1999 | Gould et al. |
| 5,970,472 | A | 10/1999 | Allsop et al. |
| 5,974,119 | A | 10/1999 | Utsumi |
| 5,974,406 | A | 10/1999 | Bisdikian et al. |
| 5,987,434 | A | 11/1999 | Libman |
| 5,987,440 | A | 11/1999 | O'Neil et al. |
| 5,987,500 | A | 11/1999 | Arunachalam |
| 5,995,947 | A | 11/1999 | Fraser et al. |
| 6,014,645 | A | 1/2000 | Cunnigham |
| 6,041,308 | A | 3/2000 | Walker et al. |
| 6,058,379 | A | 5/2000 | Odom et al. |
| 6,067,525 | A | 5/2000 | Johnson et al. |
| 6,073,129 | A | 6/2000 | Levine et al. |
| 6,076,072 | A | 6/2000 | Libman |
| 6,085,169 | A | 7/2000 | Walker et al. |
| 6,088,686 | A | 7/2000 | Walker et al. |
| 6,105,007 | A | 8/2000 | Norris |
| 6,108,639 | A | 8/2000 | Walker et al. |
| 6,112,190 | A | 8/2000 | Fletcher et al. |
| 6,130,933 | A * | 10/2000 | Miloslavsky ............... 379/90.01 |
| 6,134,534 | A | 10/2000 | Walker et al. |
| 6,202,054 | B1 | 3/2001 | Lawlor et al. |
| 6,226,623 | B1 | 5/2001 | Schein et al. |
| 6,236,972 | B1 | 5/2001 | Shkedy |
| 6,236,977 | B1 | 5/2001 | Verba et al. |
| 6,243,691 | B1 | 6/2001 | Fisher et al. |
| 6,260,024 | B1 | 7/2001 | Shkedy |
| 6,282,517 | B1 | 8/2001 | Wolfe et al. |
| 6,289,319 | B1 | 9/2001 | Lockwood |
| 6,311,178 | B1 | 10/2001 | Bi et al. |
| 6,332,129 | B1 | 12/2001 | Walker et al. |
| 6,341,270 | B1 | 1/2002 | Esposito et al. |
| 6,356,878 | B1 | 3/2002 | Walker et al. |
| 6,385,594 | B1 | 5/2002 | Lebda et al. |
| 6,513,013 | B1 | 1/2003 | Stephanou |
| 6,546,374 | B1 | 4/2003 | Esposito et al. |
| 6,587,838 | B1 | 7/2003 | Esposito et al. |
| 6,603,487 | B1 | 8/2003 | Bennett et al. |
| 6,611,816 | B2 | 8/2003 | Lebda et al. |
| 6,669,832 | B1 | 12/2003 | Saito et al. |
| 6,684,189 | B1 | 1/2004 | Ryan et al. |
| 6,868,389 | B1 | 3/2005 | Wilkins et al. |
| 7,010,508 | B1 | 3/2006 | Lockwood |
| 7,023,979 | B1 | 4/2006 | Wu et al. |
| 7,035,699 | B1 | 4/2006 | Anderson et al. |
| 7,047,206 | B1 | 5/2006 | Schultze |
| 7,068,643 | B1 | 6/2006 | Hammond |
| 7,133,835 | B1 | 11/2006 | Fusz et al. |
| 7,181,427 | B1 | 2/2007 | DeFrancesco et al. |
| 7,216,102 | B2 | 5/2007 | Nabe |
| 7,216,103 | B2 | 5/2007 | Friedland et al. |
| 7,305,364 | B2 * | 12/2007 | Nabe et al. ....................... 705/37 |
| 7,310,617 | B1 | 12/2007 | Cunningham |
| 7,340,411 | B2 * | 3/2008 | Cook ........................... 705/7.13 |
| 7,373,325 | B1 | 5/2008 | Hadingham et al. |
| 7,386,508 | B1 | 6/2008 | Walker et al. |
| 7,467,438 | B2 | 12/2008 | Ryman |
| 7,546,268 | B1 | 6/2009 | DiGiovanni et al. |
| 7,676,034 | B1 | 3/2010 | Wu et al. |
| 8,533,094 | B1 * | 9/2013 | Dorr ............................... 705/37 |
| 2001/0049648 | A1 | 12/2001 | Naylor et al. |
| 2002/0035537 | A1 | 3/2002 | Waller et al. |
| 2002/0059095 | A1 | 5/2002 | Cook |
| 2002/0072954 | A1 | 6/2002 | Sales |
| 2002/0103689 | A1 * | 8/2002 | Hornick et al. .................... 705/9 |
| 2002/0103715 | A1 | 8/2002 | Bennett et al. |
| 2002/0120554 | A1 | 8/2002 | Vega |
| 2002/0178077 | A1 | 11/2002 | Katz et al. |
| 2002/0188689 | A1 | 12/2002 | Michael |
| 2002/0194103 | A1 | 12/2002 | Nabe |
| 2003/0028394 | A1 * | 2/2003 | Alzer et al. ....................... 705/1 |
| 2003/0055757 | A1 | 3/2003 | Pfiffner et al. |
| 2003/0154120 | A1 | 8/2003 | Freishtat et al. |
| 2003/0225682 | A1 | 12/2003 | Montemer |
| 2004/0103041 | A1 | 5/2004 | Alston |
| 2004/0122735 | A1 | 6/2004 | Meshkin |
| 2004/0225511 | A1 * | 11/2004 | Gould ............................... 705/1 |
| 2004/0225526 | A1 * | 11/2004 | Gould ............................... 705/1 |
| 2004/0230438 | A1 | 11/2004 | Pasquale et al. |
| 2005/0125334 | A1 | 6/2005 | Masella et al. |
| 2005/0125487 | A1 * | 6/2005 | O'Connor et al. ............. 709/201 |
| 2005/0131760 | A1 | 6/2005 | Manning et al. |
| 2005/0144052 | A1 | 6/2005 | Harding et al. |
| 2005/0147228 | A1 | 7/2005 | Perrella et al. |
| 2005/0149397 | A1 | 7/2005 | Morgenstern et al. |
| 2005/0234798 | A1 | 10/2005 | Du Preez et al. |
| 2006/0080229 | A1 | 4/2006 | Masella et al. |

OTHER PUBLICATIONS

WayBackMachine, "The key to smarter, easier borrowing", Jun. 29, 1997, 2 pages, http://replay.waybackmachine.org/19970629193656/http://www.citibank.com/us/borrowandloans/.

Walker, Larry, "Adapting to a Consumer-Driven Marketplace", pp. 34-37, Housing Finance International.

Cocheo, Steve, "Automated underwriting: Tower of techno-Babel?", Sep. 1995, pp. 68, 72, 74, 104, First of a Series—Mortgage Lending, ABA Banking Journal.

"Chase Manhattan Mortgage Corporation Teams With Intuit as a Charter Lender for QuickenMortgage", Oct. 14, 1997, 1 page, Mountain View, California.

Trademark Search of Creditsource USA mark.

"Intuit Launches QuickenMortgage on the Internet", Nov. 4, 1997, 2 pages, Mountain View, California.

"Intuit's QuickenMortgage 2.0 Offers Online Applications & Five New Lenders", Mar. 11, 1998. 2 pages, Mountain View, California.

Cohen, Jackie, "To Mall or Not to Mall", May 1, 1998, 7 pages, vol. 11, No. 5, Bank Technology News.

Lending Tree, LLC history, pp. 293-296, vol. 93, International Directory of Company Histories.

Leong, S.K., et al., "An Internet application for on-line banking", Jul. 18, 1997, pp. 1534-1540, Computer Communications 20.

Guttentag, Jack, et al., "Point-of-Sale Mortgage Technology", pp. 3-12, Housing Finance International.

"QuickenMortgage, One of the Most Popular Mortgage Web Sites, Celebrates One Year Anniversary", Nov. 5, 1998, 2 pages, Mountain View, California.

Megboluge, Isaac F., "Residential Real Estate in the Age of Information Technology", Dec. 1997, pp. 1-6, Housing Finance International.

Cocheo, Steve, "Scoring gains ground while the Web waits", Jan. 1997, p. 52, vol. 89, No. 1.

(56) References Cited

OTHER PUBLICATIONS

Malone. Thomas, W., "What is Coordination Theory", Feb. 19, 1988, pp. 1-29, Massachusetts Institute of Technology, Cambridge, Massachusetts.

"The Mortgage Loan Page-tm, Free Mortgage Broker Search Engine", 2 pages, May 8, 1996, Comcity—News & Press Release, Fremont, California.

Williamson, A.G., "Refining a neural network credit application vetting system with a genetic algorithm", 1995, pp. 261-277, vol. 18, Journal of Microcomputer Applications, United Kingdom.

Morgan-Baldwin, Amelia A., at al., "Strategy and Impacts of Expert Systems for Bank Lending", 1996, pp. 455-461, vol. 11, No. 4, Expert Systems With Applications.

"Auto-By-Tel: The Premiere Auto Buying Service on the Internet", Feb. 5, 1998, 1 page, http://replay.waybackmachine.org/19980205084049/http://autobytel.com/about/index.cfm?id=abt.

WayBackMachine internet page regarding Mortgages, Apr. 24, 1998, 1 page, http://replay.waybackmachine.org/19980425195033/http://loanpage.com/.

InsWeb, "A Better Way to Handle Your insurance Needs", Apr. 11, 192011, 1 page, http://replay.waybackmachine.org/19980213062755/http://www1.insweb.com/.

LoanWeb.com information page, Apr. 25, 1998, 1 page, http://replay.waybackmachine.org/19980425195926/http://loanweb.com/.

WayBackMachine internet page regarding GetSmart, Feb. 13, 1998, 1 page, http://replay.waybackmachine.org/19980213053619/http://www1.getsmart.com/.

E-LOAN internet page, 1997, 1 page, Palo Alto, California, http://replay.waybackmachine.org/19980127150039/http://eloan.com/.

4freequotes.com's National Insurance Directory homepage, Apr. 22, 1998, 1 page, http://replay.waybackmachine.org/19980422084203/http://www.4freequotes.com/.

WayBackMachine directory page, May 22, 1998, 1 page, http://replay.waybackmachine.org/19980522084055/http://credit.com/.

WayBackMachine directory page, Dec. 12, 1998, 1 page, http://replay.waybackmachine.org/19981206025209/http://www.theloanpage.com/.

WayBackMachine loanlocator.com page, Apr. 2005, 2 pages, http://replay.waybackmachine.org/19981212032218/http://www.rates.com/.

WayBackMachine—The Golden Credit Union homepage, Jun. 4, 1997, p. 1, http://replay.waybackmachine.org/19970604123321/http://www.golden1.com/.

Free New Tools Designed to Help Carpoint-Affillated Dealers Respond as Quickly as Possible to Customer Inquiries, Oct. 20, 1998, Microsoft.com, 1 page, Redmond, Washington.

Microsoft Licenses DealerPoint Technology to Help Honda and Acura Dealers Manage Internet Sales, Sep. 20, 1999, Microsoft.com, 1 page, San Francisco, California.

Auto-By-Tel advertisement, 1996, 3 Pages, Auto-By-Tel Corporation, Irvine, California.

A Better Way to Handle Your Insurance Needs advertisement, Feb. 20, 2008, 1 page.

AutoWeb Interactive advertisement.

1997 BMW 3 Series M3 Price Quote, 1997 Ford Ranger SuperCab XLT 4×4 125WB Price Quote, CarPoint, 1997 Honda Accord Price Quote, 3 pages.

1997 Ford Ranger SuperCab XLT 4×4 125WB Price Quote.

"AutoWeb Interactive wins the PC Magazine Top 100 Web Sites award for the Second time!". 1 page, Apr. 18, 1997.

Press Releases, InsWeb Announces Inclusion in Microsoft Money 99 Financial Suite, Aug. 10, 1998, 1 page, San Mateo, California.

Press Releases, 1 Million Customers Use InsWeb in First Half of 199, Aug. 5, 1998, 1 page, San Mateo, California.

Press Releases, Infoseek Launches Auto Insurance Center Powered by InsWeb, Sep. 15, 1998, 1 page, San Mateo, California.

Press Releases, InsWeb PR articles.

Steffen, Don, "Probable Tax Changes", Jun. 27, 1997, Weekly Update Tax News and Analysis, San Francisco, California.

WayBackMachine article, http://www.insweb.com, 1 page.

Kane, Margaret, "Microsoft auto software hits exit ramp", CNET News.com, Jan. 22, 2003, 1 page.

Microsoft Delarpoint.Net Announces First International Deployment of Its Lead Management System to Ford Dealers Across United Kingdom, Dec. 11, 2001, 1 page, Redmond, Washington.

Microsoft Licenses DealerPoint Technology to Help Honda and Acura Dealers Manage Internet Leads, Sep. 20, 1999, 1 page, San Francisco, California.

Cox, Beth, Microsoft Sells Off Dealerpoint, Real IT News, Jan. 22, 2003, 1 page.

Auto Channel list, 1 page.

Markoff, John, "A Web-Researched Ford in Microsoft's Future", The New York Times, Sep. 21, 1999, 1 page.

Bobulsky, Steve, "We Connect North American Automobile Dealers and Related Businesses to The Internet and The World Wide Web.", Webwise, www.webwheels.com, 1 page.

LendingTree, "Apply in Minutes, Know Within Hours.", 1999, www.lendingtree.com, 2 pages.

Paul, Lauren Gibbons, at al., "10 who dared to be different", PC Week, v14, n1, Jan. 6, 1997, p. 21(4).

"Retail Technology", Automative News, Jan. 12, 1998, 1 page.

Jiang, et al., "A Concept-Based Approach to Retrieval from an Electronic Industrial Directory", International Journal of Electronic Commerce, Fall 1996, vol. 1, No. 1, pp. 51-72.

Doorensos, at al., "A Scalable Comparison-Shopping Agent for the World-Wide Web", Department of Computer Science and Engineering, University of Washington, 1997, 1 page.

Wildemuth, Scott, "A simple case of supply and demand", Datamation, v43, n11, p. 99(3), Nov. 1997, 1 page.

McClanahan, Robert H., "A System to Distribute Real-Time Operational Data Utilizing Existing Public Communications Infrastructure", Technical Information Systems, p. C6-1.

Andreasen, Louis, et al., "ADSI: The dawn of a new age of interactive services", Ottawa: Dec. 1993, Issue 97, p. 34-51.

Rao, Srikumar S., "Are your customers being served", The H.W. Wilson Company, vol. 19, Sep. 16, 1997, 1 page.

Harris, Donna, "Internet sales cutting profits from financing, dealers say.", Automative News, v. 71, Issue 5730, Sep. 8, 1997, 1 page.

"Auto-By-Tel Wins With Educated Customers and Low Prices", Interactive Marketing News, vol. 3, Issue 28, Oct. 18, 1996, 1 page.

Autobytel.com Puts Representatives in the Field, Becoming First Online Buying Service to Localize Dealer Support Services, Sinocast, Nov. 5, 1998, 1 page, Irvine, California.

"Automotive Sites Missing Web Ad Opportunities", Electronic Marketplace Report, vol. 10, Issue 22, Nov. 19, 1996, 1 page.

Blumenstein, Rebecca, "On-line showroom Web site information helps buyers drive hard bargains, but car dealer profit, too,", Kansas City Star, Jan. 6, 1998, 1 page.

Embedded Systems Conference Spring advertisement, 1 page.

Conhaim, Wallys W., "Buying cars online.", Link-Up, vol. 15, Issue n5, Sep. 1, 1998, 1 page.

Industrial Distribution News, "GM buying into online auctions", Nov. 1998, http://www.inddist.com, 1 page.

Westlaw Delivery Summary Report for Taylor, David, Dec. 13, 2008, Allnews database, 1 page.

Couretas, John, "Carpoint Web Site Adds Personal Touch: The Plan: Snag and Hold Surfers", Automative News, Nov. 9, 1998, 1 page.

Direct Marketing, "Trading Post Charges $10 for Limited Edition Catalog", Jul. 1983, 1 page.

Online—The Magazine of Online Information Systems. Nov./Dec. 1995, vol. 19—No. 6, 1 page.

S&MM Table of Contents—Jan. 14, 1985, 1 page.

Lee, Ho Geun, "Do electronic marketplaces lower the price of goods?", Communications of the ACM, vol. 41, n1, Jan. 1998, pp. 73-80.

Barua, Anitesh, et al., "Efficient selection of suppliers over the Internet", Journal of Management Information Systems:JMIS, vol. 13, n4., Spring 1997, 1 page.

Online—The Magazine of Online Information Systems, Mar. 1994, vol. 18—No. 2, 1 page.

InformationWeek for Business and Technology Managers—Cover, 1 page.

(56) References Cited

OTHER PUBLICATIONS

Natalie Engler, "Emerging Enterprise—Online Opportunity", www.informationweek.com, Jan. 11, 1999, 1 page.
Schenecker, Mark, et al., "Goodbye to old-fashioned EDI", Informationweek, n713, p. 73-88, Dec. 14, 1998, 1 page.
Microsoft CarPoint, Harvard Business School Article, Aug. 21, 2000, 1 page.
Carpoint in 1999, Harvard Business School Article. Oct. 6, 2000, 1 page.
Carpenter, Maile, "How to play the bidding game", Money, Fall 1998, vol. 1, Issue 2, pp. 70-71.
"Autoweb.com: Industry Leader Autoweb.com Revolutionizes Online Car Buying With Risk-Free Pricing Structure", Jan. 31, 1998, 1 page.
"Briefs", Journal of Commerce, Jan. 13, 1998, 1 page.
"Finet Expands with Knight Ridder.", Mortgage Marketplace, vol. 22, Issue 331, Jan. 4, 1999, 1 page.
"Lycos and AdOne's ClassifiedWarehouse.com Create Online Alliance; The Web's Most Comprehensive Classified Listings Come to Lycos.com", Business Wire, Dec. 2, 1998, p. 1093.
"Microsoft Unveils Carpoint Internet Car-Buying Service", PR Newswire, Jul. 17, 1996, 1 page, Redmond, Washington.
"Navidec Announces 'Wheels' Launches Progress Ahead of Schedule", PR Newswire, Oct. 27, 1997, 1 page, Denver, Colorado.
"Navidec Inc. Announces Third Quarter Results", PR Newswire, Nov. 6, 1997, 1 page, Denver, Colorado.
"Autoweb.com's New Risk-Free Pricing Structure Revolutionizes Online Car Buying Industry", PR Newswire, Feb. 9, 1998, 1 page, Santa Clara, California.
Burton, David, "Paging the Mercury Way", Business Equipment Digest, Jan. 1989, 1 page.
Neuwe, Ellwood I., "Personal Communication in Traditional Cellular Networks", Glenayre Electronics, vol. 2602, p. 184, Duluth, Georgia.
Cooke, James Aaron, "Point, click, and shop.", Logistics Management, vol. 36, n2, p. 70S(3), Feb. 1997.
"Net nightmares.", Chief Executive, Jan. 1, 1998, 1 page.
Cardwell, Annette, "Cyberscene; On-Line Auction Sites are Coming on Strong", Boston Herald, January 13, 1999, 1 Page.
Rafter, Michelle V., "Auto-By-Tel Your On-line Auto Source", St. Louis Post-Dispatch, Aug. 21, 1996, 1 page.
"Retain advertising and catalogs.", Seybold Report on Publishing Systems, vol. 23, n16, May 10, 1994, p. 56(6).
Naughton, Keith, et al., "Revolution in the Showroom: Finally, consumers are in the driver's seat—and pushy dealers look like dinosaurs", Business Week, No. 3463, Feb. 19, 1996, p. 70.
Stevens, Tim, "Set sale on the 'Net.", Industry Week, vol. 246, n8, Apr. 21, 1997, p. 56(7).
Henry Ed, "The Virtual Car Buyer", Sending: On-Line Finances, Sep. 1995, 1 page.
Nauman, Matt, et al., "The Virtual Showroom Car Shopping on the Web", San Jose Mercury News, Feb. 7, 1997, 1 page.
Marketing Communications Contents, vol. 14, No. 5, May 1989, 1 page.
Choudhury, Vivek, et al., "Uses and consequences of electronic markets: An empirical investigation in the aircraft parts industry", MIS Quarterly, vol. 22, n4, Dec. 1998, pp. 471-507.
"Want to buy a new car?" Dec. 14, 1998. 1 page.
"What car? TV Limited: What car? Online and What car? Text boost manufacturer and dealer sales leads", M2 Presswire, Aug. 31, 1998, 1 page.
Little, Thomas, "Commerce on the Internet", IEEE Multimedia, 1994, 1 page.
Wiley, John & Sons, "The Extended Sales Enterprise: The Next Generation of Customer Management Automation", Khandpur & Wevers, 1998, 1 page.
"Sales Team Application", Integrated Sales & Marketing, 1996, 1 page.
AutoWeb.com, AutoWeb Interactive, on or before Jan. 13, 1998, 1 page.
Lawrence, Magid, "Opening Database Doors With Approach for Windows [Final Edition]", The Washington Post (pre-1997 Fulltext) [Washington, D.C.] Mar. 9, 1992, F17.
Info Now Launches Version 5.0 of Enterprise Channel Management Software: PR Newswire Feb. 19, 2002, 3 pages.
H Launches Partnership with DDB RApp Digital, LB Works Ogilvy One; PR Newswire, Jun. 27, 2002, 2 pages.
Witness Systems Launches Japanese Version of eQuality Sorftware, Business, p. 2234, Apr. 24, 2002, 3 pages.

* cited by examiner

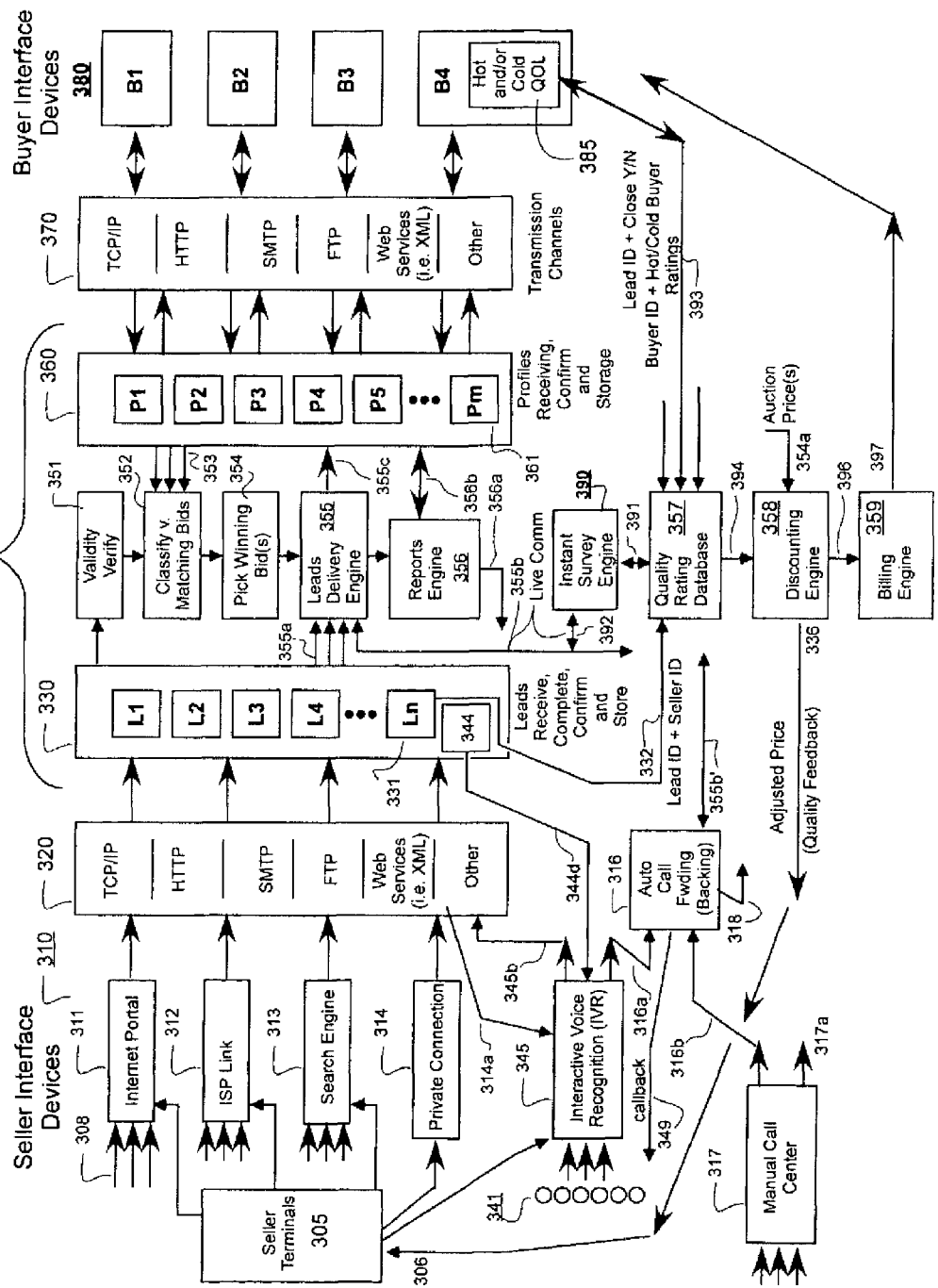

AUTOMATED ATTACHMENT OF SEGMENTATION DATA TO HOT CONTACT LEADS FOR FACILITATING MATCHING OF LEADS TO INTERESTED LEAD BUYERS

CLAIM OF BENEFIT

The present application is a continuation-in-part (CIP) of U.S. provisional application 60/674,868 (filed Apr. 25, 2005 originally entitled "Inbound Hot Lead Transfer (Via Telephone)"). The present application is additionally a continuation-in-part of U.S. Ser. No. 11/207,571 filed Aug. 19, 2005 (originally entitled "System for Implementing Automated Open Market Auctioning of Leads") where the latter '571 application relates back to the following U.S. provisional applications: 60/603,442 (filed Aug. 19, 2004); 60/610,470 (filed Sep. 15, 2004); 60/637,231 (filed Dec. 17, 2004); and said 60/674,868. The present application yet further relates to U.S. Ser. No. 11/373,633 filed Mar. 9, 2006 (originally entitled "Ranking System Using Instant Post-Transaction Surveying of Transaction Judges" Copending applications 60/674,868, Ser. No. 11/207,571 and Ser. No. 11/373,633 are owned by the owner of the present application, their disclosures are incorporated herein by reference and benefit of said earlier filed disclosures is claimed to the extent permitted by law.

FIELD OF DISCLOSURE

The present disclosure of invention relates generally to automated matching of interested consumers and corresponding vendors of goods and/or services. The disclosure relates more specifically to automated methods for generating leads and lead-categorizing data; and matching of, auctioning of or bidding off of leads based on value when such leads are offered by lead promoters to competing seekers or buyers of such leads.

DESCRIPTION OF RELATED ART

Free market theory assumes that vendors and consumers of goods and/or services can easily find one another and then negotiate mutually beneficial buy and sell transactions. Reality does not match with theory though. For a variety of reasons (including legal regulatory ones and practical ones such as timeliness of delivery) not every vendor can service every consumer and not every vendor realizes the same economic return from having tried to service a particular consumer with respect to corresponding goods and/or services. Also, a willing and ready to talk consumer is not always available at the same moment that a given potential vendor is ready to process his next prospect. Matching time-wise ready consumers with time-wise ready vendors is a problem.

Speaking in broad terms, there are an astronomically large number of potential customers, clients or other consumers available at different times for buying or otherwise acquiring vendible goods and/or services from vendors. The pool of potential consumers may include all persons as well as public and private corporations, partnerships, governmental organizations and other such entities. When used herein, consumer is understood to broadly cover an authorized procurement agent of a consuming organization or individual as well as the case where an individual consumer is directly representing himself. Similarly, vendor is understood to refer broadly to either individual vendors or vending organization or authorized agents of such vendors. Different laws, rules and/or customs may operate in different localities and apply differently to the different kinds of possible consumers, vendors and transactions between such parties. Not every vendor is organized to efficiently or legally service every kind of consumer and/or every magnitude or type of transaction. More specifically, some vendors may prefer to deal only in large scale or wholesale transactions with government organizations because they are organized to efficiently and legally handle such transactions while other vendors may prefer to deal only in small scale or retail and non-government transactions because they are organized to more efficiently handle these other kinds of transactions. So matching of the appropriate kind of vendor to a corresponding kind of consumer and vise versa is important. Inefficiencies develop when non-matching potential consumers and potential vendors begin negotiations with one another only to discover later after having expended time, effort and perhaps initial monies that they are incompatible and cannot complete the initially contemplated transaction(s). Also, as mentioned, timing can be important The potential consumer has to be ready to engage in a live interaction (e.g., a telephone conversation) at the same time that a correspondingly matched vendor is ready to process his next potential customer. The matching problem is not limited to just matching the product, price and quantity interests of potential consumers and potential vendors. The chronological availability of at least one of the parties is also a problem. (Usually, when there is an abundance of potential vendors and a shortage of potential consumers, the vendors must make themselves more readily available to talk as soon as a ready and matched consumer is found because otherwise the consumer is likely to make contact with a more accessible and competing second vendor.)

Classes of vendible goods and/or services can span large domains and can have complications as relating to timely and legal delivery of goods and/or services as well as return on efforts for the parties involved. Potential transactions may include anything from impulse purchase of items such as small candy bars to more methodically and rationally thought out acquisitions of financial instruments (e.g., home mortgages, loan refinancing packages) and/or of high-priced transportation vehicles (e.g., cars, trucks, airplanes etc.) and/or of high-priced other properties or services. The present disclosure is directed more so to the vending of high-end goods and/or services and the matching of appropriate vendors with potential consumers and vise versa. Nonetheless, impulsive behavior, or motivational leanings by potential consumers is important because potential consumers are not always in the right frame of mind to hear a sales pitch or otherwise pursue an interest in a good or service. Timing is important. Vendors want to connect with serviceable potential consumers when such consumers are "hot"; in other words when they are available and in a positive frame of mind for hearing more about a given package of one or more goods and/or services and there is a good chance that the desired transaction can be consummated (not inhibited due to legal and/or practical serviceability issues). Similarly, consumers do not want to waste time chasing after potential vendors who, in the end cannot or unwilling to service the consumer's desires for reasons that should have been apparent at the beginning of discussions.

It should be apparent that a vendor of highly sophisticated goods and/or services (e.g., luxury automobiles with attached loan or leasing packages) will not want to waste time, energy and money reaching out to a potential consumer who is merely looking, to acquire a candy bar in a far away local; and vise versa that such a consumer will generally not want to be bothered by a sales pitch from that vendor. Instead the high-end vendor would like to acquire immediate connections to, or a short list pointing to, currently available and motivated prospective consumers who are financially capable and geographically pre-qualified and ready to soon close on a deal for the vendor's goods and/or services where the scale and type of deal matches the way the vendor is organized. Through such connections, the vendor can direct his or her marketing energies on the best and "hottest" prospects rather than wasting those energies on a more diffuse and chronologically non-receptive as well as unserviceable audience.

A leads-providing industry has grown around the developing of connections between optimally-ready and prospective consumers for various high-end goods and/or services and matching vendors of various such vendibles. A subset of this industry may be referred to as the "hot leads" market; this often indicating that a motivated consumer is available live on the telephone or over another real time telecommunications link and therefore it is desirable for a matching lead seeker to be available to quickly grab hold of this available "hot lead" as soon as possible so that the lead seeker can capitalize on the current motivation of the consumer. But first there is the problem of determining who is a matching lead seeker for what specific type of consumer, what specific mix of goods and/or services, what scale of transaction, and also what fair price should be charged to that seeker for having received an opportunity to close on a given "hot lead".

In terms of additional introduction to the subject area at hand, it may be observed that the leads-providing industry can be vertically divided into a plurality of interlinked layers including: (a) a leads promotion, capture and generating layer, (b) a leads offering and selling layer, (c) a leads buying layer, and (d) a leads exploitation or converting layer where, for the last layer, purchased leads are followed through on in hopes of converting the leads into consummated vendor-consumer transactions (i.e., purchases of vendor offered good and/or services).

Unless otherwise indicated, the term "lead" will be understood herein to refer to any mechanism by which a potential consumer having good current or future prospects for purchasing or otherwise consuming one or more goods and/or services is about to be or is being connected directly or indirectly to a vendor of such goods and/or services (or vise versa) such that the vendor can appeal directly or indirectly to the prospective consumer to purchase or otherwise consume one or more goods and/or services offered by the vendor. Leads may take many forms; some of which have already been mentioned, the possibilities including but not limited to: (a) a live or on-hold and transferable telephone connection to a potentially interested consumer; (b) an ongoing Internet chat or other directed communication with a potentially interested consumer, and (c) one or more data sets that identify one or more potentially interested consumers and characteristics associated with their potential consumerism.

A variety of methods have been, and continue to be developed for originating leads and for conveying those leads up the vertically integrated leads capture and offer market, from the promoters and originators to the ultimate seekers, purchasers and users of those leads, namely, the vendors (or vendor representatives) who wish to convert a large percentage of bought leads into actualized and profitable consumer-vendor transactions.

Problems exist in the leads seeking (leads buying) and leads offering (leads selling) marketplace. It has been difficult to create fair and efficient pricing mechanisms for leads. Often the process is very haphazard and buyers sometimes do not get fair value in exchange for what they pay in order to acquire a lead. Leads come in many flavors, qualities and potential values to the ultimate users of those leads. Each ultimate user may have a unique set of needs and abilities to draw value from acquired leads. The vendor of high-end end-of-season automobiles, for example, would have little use for a lead pointing to a potential customer who is interested only in buying a low-end automobile or low-end real estate property 6 months from now and who is completely uninterested in considering an immediate high-end acquisition. It would be a waste of time and energy for both the consumer and vendor to establish contacts with one another in hopes of possibly closing a deal in the short term. Nonetheless, there are unscrupulous bulk sellers of leads who are willing to sell mixtures of junk and good leads simply for the bulk profit and without regard for how the dispensing of even a few junk leads can hurt everyone in the industry. A few bad apples spoil the barrel, so to speak, because sellers of high quality leads have a hard time differentiating themselves from lower-priced purveyors of junk or mixed quality leads. Buyers of leads have a hard time identifying trustable sellers of leads. Buyers of leads find themselves often wasting time on junk leads that lead to dead ends or duplicative efforts. The buyers are wary of spending too much for a potentially bad (unconvertible) lead. As a result sellers of high quality leads do not get fair value for their offerings and are generally driven out of the marketplace by lower priced offers of massive numbers of junk leads. Heretofore, a haphazard array of different techniques were used for generating lead data, matching interested lead buyers with lead sellers and fairly compensating the lead sellers for their efforts. Improved methods are disclosed herein for generating lead-categorizing data in a way which facilitates the matching of interested lead buyers with the offerings from lead sellers that are valuable to the lead buyers.

SUMMARY

In accordance with the present disclosure of invention, segmentation data (lead-categorizing data) is automatically attached on-the-fly to hot contact leads as the hot contacts are developed and routed through respective telecommunication pathways. Different ones of possible telecommunication pathways are logically assigned (on a dynamic or static assignment basis) to different patterns of complete or partially-complete segmentation information. When a hot contact communication routes through a given one of these information-assigned pathways, the communication inherits the assigned segmentation information of that pathway. Thus if routing pathways are organized as branches of logical tree structures, hot-contact communications can have their inherited segmentation data refined or grown to a desired level of resolution or completion by routing the communications through a respective number of information-assigned pathways. Completed segmentation data may be used for automatically joining a consumer and a matched vendor in a live telecommunications interaction (e.g., a live analog or digitized telephone call).

A machine-implemented method of joining a potential consumer and a matching potential vendor in a live telecommunications interaction in accordance with the disclosure comprises the machine-implemented steps of: (a) collecting segmentation data that identifies consuming desires and/or purchasing characteristics of a given potential consumer, where the segmentation data further identifies a promoter (e.g., lead seller) responsible for initiating the process of collecting the segmentation data; (b) using the collected segmentation data to automatically find a matching potential vendor having a machine-read profile that indicates the found vendor desires to make contact with one or more potential consumers having part or all of the consuming desires identified by the collected segmentation data and/or having part or all of the purchasing characteristics identified by the collected segmentation data; and (c) automatically forming a live telecommunications connection between the potential consumer and the matching potential vendor.

In one class of embodiments, the segmentation data that attaches by inheritance to a routing-through hot-contact communication of a potential consumer is structured to differentiate the corresponding lead (i.e. characteristics of the consumer) according to the lead's probability of serviceability by different ones of potential vendors and/or according to the lead's expected (probabilistic) amount of economic return on investment for the lead seeker who acquires that lead (e.g., a lead buying vendor). More specifically, in one embodiment the attached segmentation data includes one or more of: (a) a promoter ID; (b) a product or service ID; (c) a scale of transaction indicator; (d) a promotion channel ID; (e) a customer rating; (f) a geographic zone identifier and (g) a time-of-probable-closing indicator. Some vendors may be unable to service the lead due to the geographic zone data (f) attached thereto; for example because the consumer and/or property is outside of the geographic zone(s) serviceable by such vendors. So the lead has no value to them at all because the potential consumer that is represented by the lead is understood to be unserviceable even before speaking to that consumer. Some vendors may be unwilling or less willing to service certain leads due to the scale of transaction indicator (c); because the transaction size is too small or too big to make it worth their while to speak to that consumer; unless that is, the lead is sold at a steep discount. Some vendors may be unwilling or less willing to service certain leads due to the consumer not being able to, or not willing to, close on a deal within a predefined time-to-closing span (g) defined by the vendor. On the other hand, for some vendors, the same lead may have very high value because the vendor's business model is optimally matched for attached segmentation factors such as above (b), (c), (e) (f) and/or (g) of the lead and thus the vendor has high probability of realizing maximum return on investment (ROI) from purchasing the lead and trying to close on the subsequent deal negotiations in a time frame and manner suitable to the vendor's business operations.

In one embodiment, the amount of serviceability information that needs to be attached to a lead in order for the serviceability portion of a corresponding segmentation data package to be deemed complete is defined by corresponding serviceability criteria demanded by profiles created for registered vendors who use a corresponding leads-to-lead_seekers matching system. In one embodiment, the return on investment information that is required for deeming a segmentation data package of a given lead to be complete is defined by corresponding return criteria established by profiles created for registered vendors who use a corresponding leads-to-lead_seekers matching system. In other words, an automated completion-determining means (e.g., computer) scans the stored profiles of registered vendors and automatically determines from those scanned profiles what segmentation data is needed for satisfying the serviceability and/or return-on-investment criteria of the potential vendors who have their profiles stored in the system. An automated collecting means automatically determines from the scanned profiles what band boundaries are to be used when collecting the segmentation data. By way of example, the edges of the range $100,000 to $250,000 would be the loan-amount band boundaries when a potential consumer is asked for example: 'Are you seeking a home refinance loan in the amount range of $100,000 to $250,000?' This may be an inefficient query if most online vendors are currently seeking potential consumers in the loan range of $85,000 to $200,000. In accordance with one aspect of the disclosure, a segmentation data collecting means (e.g., an IVR unit) automatically adjusts its presented range edges so as to group potential consumers in the bands indicated by the active profiles of currently participating vendors. In one embodiment, when profiles of lead seekers indicate the seekers are not interested in self-reported credit ratings of the potential consumers for certain bands of leads, the IVR unit responsively stops asking for such non-differentiating segmentation data (e.g., self-reported credit ratings). In this way, potential consumers are not annoyed with more questions than are truly needed for finding a matching vendor.

In accordance with another aspect of the present disclosure, as a potential consumer engages in a process of making contact with a promoter and/or the promoter's web site (or even directly with a leads-to-seekers matching station), information is simultaneously collected directly or inferentially from the contact making process and added to an accumulating package of segmentation data (SD) that logically attaches to the lead connection. When complete, the latter SD package is forwarded in real time to an automated matching and/or lead auctioning system and the collected SD (segmentation data) is used for automatically matching the potential consumer with an interested and readily available, lead seeker (e.g., lead buyer). Then a telecommunications connection is completed between the consumer and a matched vendor. In this way a motivated and available consumer can be quickly connected to a matched vendor who has high probability of being able to service the consumers desires and the vendor can, vise versa be quickly connected to a consumer who is on line and has high probability of being serviceable by the vendor and of providing the vendor with a good return (ROI) on the vendor's efforts to convert the acquired lead into a consummated transaction. It is a win-win situation for both consumer and vendor because each is able to quickly and efficiently find his match in a time frame suitable for both parties. It is also a win for the lead promoter (lead seller), as will be seen, because often the lead promoter is able to receive fair market value for his offered leads from an open market auctioning system where buyers (lead seekers) compete with each other for access to leads that are perceived by the lead seekers as being the more valuable leads.

In terms of a more concrete example, a potential consumer who is currently on line is enticed via the Internet (e.g., via a promotional email message or a promotional web page) to navigate his way through a tree-organized set of web sites where the navigation pathways chosen by the potential consumer categorize that consumer (or that organization which a procurement agent represents) according to attributes such as the geographic location of the consumer and/or an associated piece of property, his/its (the consuming organization's) income/revenue range, his/its net worth and/or other financial health attribute, his health status (e.g., smoker, drinker, diabetic, etc.), the class of products or services he/it is interested in, the time frame in which he/it plans to consummate the prospective deal (e.g., close on the loan), and so forth. At the end of this navigation process, the consumer (or agent thereof) is induced to participate in a live voice call or another type of live telecommunications interaction (e.g., instant messaging chat) where the interaction passes through a specific telecommunications pathway or node such as a specific, toll-free telephone number. Unbeknownst to the potential consumer, the identity of the specific telecommunications pathway/node (e.g., special telephone number) was automatically seeded into the promotional material that the consumer navigated through (e.g., by opening a promoter's web page or email message). The seeded pathway identification was provided by an automated hot-contact processing station that has assigned a given segmentation data package (complete or partial) to that pathway identification. In one embodiment, the seeded pathway identification was logically pre-linked in the processing station with the corresponding promoter's identification and with an identification of other segmentation data factors. The other segmentation data factors may include: (b') product and/or service identifications; (c') an amount of transaction indicator; (e') a customer income and/or credit rating indicator; (f') a customer place of residence identifier and/or (f") a location of property indicator. The settings of these segmentation data factors for this potential consumer may have been inferred for example, from the potential consumer having first navigated through the tree-like sequence of web pages that end with a leaf web page presenting the seeded pathway identification (e.g., a seeded telephone number). When the consumer finally calls the specific, toll-free telephone number (or one of a list of seeded-out numbers), he is in fact calling a number that corresponds to his having navigated from a root to a leaf of a predefined segmentation tree (search tree) and he is indicating that he is available now and ready to talk. Thus, when the inbound call comes into through that receiving telephone number (or into one of unique set of numbers assigned to that predefined segmentation data pattern), and the automated hot-contact processing station detects the use of that telephone number, the station automatically determines the associated segmentation data pattern by virtue of the identity of the receiving telephone number through which the call came. This is so because the call carrying pathway was uniquely pre-assigned (at least for a predefined length of time, i.e. a day) in the call processing station to a pre-identified sponsor or lead seller and also to a pre-identified product and/or service (e.g., home refinancing services) and/or to pre-established other consumer qualifications. So when the consumer-initiated telephone call comes in through that uniquely identified pathway/node of the station, information is already acquired by the station for example as to (a) the promoter ID; (b) a general product or service ID (e.g., home refinancing services) and/or (c) consumer qualifications. Moreover, the station of one embodiment includes a telephone caller-ID means for identifying at least the area code if not further, geography specific digits of the caller's telephone number. So the system can thereby acquire information about the caller's geographic location (geographic isolation) where this information may indicate serviceability or not to various potential vendors. In some instances, the accumulation of just a few such items of information alone may be enough to complete the assembly of a usable segmentation data package such that the completed segmentation data package can be immediately submitted to an automated leads-to-seekers matching system and/or to a leads auctioning system. The system then quickly finds at least one matching seeker (lead buyer) for whom the offered lead (due to its attached segmentation data) provides good chance of substantial return on efforts to close.

In other instances, after an inbound call arrives through a given information-assigned pathway, just one or a few more items of additional information are needed for completing a corresponding SD package before one or more optimally matched lead seekers can be found. In one embodiment, the in-calling consumer is automatically connected to an automated Interactive Voice Recognition (IVR) subsystem (alternatively known as a VRU—voice recognition unit, or an ISR—interactive speech recognition system) which asks for the missing piece or pieces of additional information. The IVR unit knows which question to ask based on the information-assigned pathway through which the call passes and/or also based on lead-specifying profiles provided by active lead seekers. In one embodiment, completion of assembly of a segmentation data package (SDP) is deemed to occur when the segmentation data assembled thus far provides enough information to determine to an acceptable and predefined degree of confidence, probability of serviceability and probability of good return on efforts for a given class of potential vendors. The missing piece(s) of information that are gathered by the IVR are added to the partially pre-formed, SD package and the completed segmentation data package is then submitted to the automated leads-to-seekers matching and/or leads auctioning system. In response, the matching/auctioning system finds at least one matching seeker of the lead (e.g., an auction winner assuming; that is, that at least one seeker has his matching profile active in the system) and the system automatically transfers the consumer-bearing telephone call to the matched lead seeker (e.g., lead buyer). In this way, a motivated, available and potential consumer is quickly and in real time connected to a matched lead seeker. The lead seeker may then continue the telephone call (or other hot contact) by conversing/interacting in real time with the matched consumer and by trying to consummate a worthwhile business transaction with the matched consumer.

In one embodiment, the automated leads-to-seekers matching system maintains a library of active requisition profiles of current seekers (e.g., lead buyers). These profiles have been created or specified by potential buyers or other seekers of leads to define the kinds of leads they seek. So the seekers indicate by the profiles that they create what kind of segmentation data they desire in order to decide whether or not to buy a given lead. In one embodiment, seekers may activate their profiles when they are ready to receive new hot leads and may deactivate their profiles (while still retaining them in system storage) at times that they do not want to receive new hot leads. In one embodiment, each profile specifies one or more of: (a) a product, product type or range of products for which leads are sought by the corresponding buyer/seeker, where the product can be one or more of various goods and/or services; (b) a value or value range for the specified product(s); (c) an acceptable location or locations of the prospective consumer and/or property; (d) exclusivity or shared nature of the lead (exclusivity meaning that the same lead cannot be later sold by the system to another seeker); (e) an opening bid amount for each matching lead; (f) product/consumer-specific other attributes of one or both of the product and prospective consumer; and (g) promoter-specific attributes such as those describing the lead promoter/seller's past successful history of providing leads within predefined conversion probability bands. In one embodiment, the other product/consumer-specific attributes include a credit rating range indicator for the prospective consumer. In one embodiment, the opening bid amount is accompanied by one or more escalating bid amounts which the buyer may wish to commit to if the profile loses in a first or subsequent round of biddings for matching leads. The escalating bid amounts reduce the probability that the bidder will win no leads while the initial bid amount may represent a bargain or discount price for a lead if no one else bids on it.

After seeker/buyer profiles are specified, stored, and activated, the leads-to-seekers matching system automatically classifies the segmentation data of incoming leads (e.g., hot leads) according to how well they match with specifications in available and activated bidding profiles. The system allows for the carrying out of bidding wars (i.e., one shot bids or repeated auction rounds) between lead buyers who specify a same one or more of the incoming leads by way of their activated profiles. This in essence is a dynamic leads-classifying system because the buyer-specified profiles dynamically define the classes or match bins into which the incoming segmentation data packages (lead specifiers) will flow for bidding upon those leads. In one embodiment, a highest bidding one of the active bidders in a given auction bin is awarded exclusive first delivery of the profile-satisfying lead(s) that is/are presented for auction in that bin. If the first winner fails to pick up a hot lead within a pre-specified time limit (e.g., 3 rings), the system re-awards the same hot lead to the next highest bidder and penalizes the first bidder for not having picked up on time. (The penalty can be a predefined fraction of the money the first bidder bid for that lead, say 10%.) The system provides an efficient marketplace means by way of which, promoters and sellers of high-quality leads can have their offerings quickly connected to one or a group of buyers for whom the leads offer highest value. Lead sellers win because they are able to match their offered leads with the desires (profiles) of the highest-paying one(s) of plural bidders (buyers) in the current market. Lead buyers win because they are able to find the best leads for their individualized needs per their individualized profile settings without having to waste time, energy and/or money sifting through diffuse mountains of junk leads that have little or no value to the specific buyers. Consumers win because they are quickly matched at the times the consumers are available and in proper frame of mind to the right kind of potential vendor.

In accordance with a further aspect of the disclosure, quality feedback means are provided for allowing buyers (successful bidders) to rate the quality of hot-contact leads they purchased from various sellers on a hot-survey or delayed basis as may be appropriate. Leads may be categorized according to deal-closing rates (conversion rates) as well as quality of the prospective consumers they point to, if at all. (Sometimes a lead provides invalid contact data.) The system knows who the sellers are and who the buyers are but does not necessarily share that information with the opposed groups of sellers and buyers. Instead, the system assigns unique identifications to exchanged leads and bids and thus keeps private track of what lead was sold by which seller. The system's quality feedback mechanism allows the sellers of high quality leads (those that point to good prospects and have high closing probabilities; i.e. the prospect is a repeat customer) to become objectively differentiated from sellers of junk leads (those that point to invalid prospects and/or have poor closing rates). The quality feedback mechanism allows the high-end sellers (e.g., promoters, sponsors) to maximize the revenues they receive for their superior product. It allows buyers to objectively distinguish between sellers/sponsors of quality and inferior leads. This is advantageous to both groups.

In accordance with another aspect of the present disclosure, an automated price adjusting mechanism is provided whereby sellers of leads that are adjudged by the quality feedback means to be high-quality sellers can be given full or premium prices for their offerings. Conversely, the automated auction pricing mechanism urges or forces sellers of leads that are adjudged by the quality feedback means to be lower-quality sellers to accept discounted or marked down compensation for their offerings depending on how poorly their offerings are rated by actual buyers. In other words, quality-adjusted pricing is automatically provided in a transparent marketplace. Lead buyers who use this system can come to understand that the prices charged to them for buying various leads are fair ones because the system automatically categorizes lead sellers into bands of high quality and lower quality sellers and automatically discounts the amounts charged for offerings by the lower quality lead sellers.

In one embodiment, prior to being provided a specific (seeded) phone number to call, the potential consumer is asked via a web form and/or through initial telephone solicitation for at least some advance segmentation data (except maybe not for the geographic location of the consumer if such information can be instead derived from a caller ID mechanism). The advance segmentation data may be used for automatically determining which of a plurality of seeded telephone numbers the consumer will next be instructed to call. For example, if the potential consumer responds with a first loan amount, first product description, and/or first credit score within respectively pre-specified first ranges, the consumer will be directed to next call a first telephone number in a set of plural numbers for pre-screened consumers; whereas if the consumer responds with one or more of a second and different loan amount, second product description, and/or second credit score within respectively pre-specified second ranges, the consumer will instead be automatically directed to next call a different second telephone number in the set established for pre-screened consumers. By this means, when the pre-screened consumer calls in, the receiving station automatically knows from the identity of the pathway/node receiving the inbound call what prespecified ranges of segmentation data the consumer belongs to and the system will be able to then immediately match the prespecified ranges with bidding seekers/buyers having corresponding profiles and the system will be able to automatically sell the hot lead off to the highest bidder in real time without asking the potential and pre-screened consumer any further questions by way of IVR interaction. So the seeded telephone number that the consumer is automatically guided towards corresponds to the segmentation data that is next matched to a buyer profile, and the hot lead is sold off to the highest bidder then having a pending bid on the system. Incidentally, the term "node" as used herein by itself is to be broadly construed as covering any means or process by way of which a given live telecommunications interaction (e.g., a telephone call or a web chat) can be uniquely identified. Methods of uniquely identifying a given interaction may include but are not limited to one or more of: identifying it by telephone number that is used, identifying it by a machine-utilized session number, identifying it by a physical conduction point through which a corresponding electrical or optical signal passes, identifying it by a voice over internet (VOIP) protocol identifier such as a H.323 address, a SIP (Session Initiation Protocol) address or a Skype™ address, identifying it by an internet protocol location identifier (IP address), identifying it by a temporarily generated web-site address, identifying it by one or more packet header identifiers, and identifying it by time slots the communication occupies in a TDM (time domain multiplexed) situation.

In a variant embodiment, the consumer provides his or her unique telephone number rather than being asked to call a specific number. The consumer may be asked to indicate whether now or a later time is the best time to contact the given consumer regarding the goods and/or services of interest. The leads matching station automatically then calls back to the unique telephone number provided by the consumer either immediately or at a time indicated to be acceptable to the consumer. Prior to, or in addition to the step where the consumer provides his or her unique telephone number, the consumer is asked for some or all of the necessary segmentation data (and if some is missing it is filled in with use of intervening IVR or human interaction) for completing a segmentation data package and then the unique telephone number which the consumer provided is logically linked in the processing station to prespecified ranges of segmentation data that the consumer and sought product belong to. Then the system automatically calls back to the unique telephone number provided by the consumer (either immediately or at a time indicated to be acceptable by the consumer) while simultaneously or beforehand matching that call-back node to a lead buyer with a matching profile and interconnecting the matched buyer into the voice line. So when the callback operation rings the consumer's telephone and the consumer picks up, a matched lead seeker/buyer is already on the other end ready to close on the deal or the matched lead seeker/buyer joins into the live telecommunications channel a few seconds later (e.g., within 10 seconds) such that the consumer perceives that he is getting immediate service regarding his inquiry.

Other aspects of the disclosure will become apparent from the below detailed description.

BRIEF DESCRIPTION OF THE DRAWINGS

The below detailed description section makes reference to the accompanying drawings, in which:

FIG. 3 is a schematic diagram of an auctioning system that receives profile specifications from buyers, leads from sellers, and conducts auctioning of supplied leads among activated profiles of buyers participating in respective auctions.

DETAILED DESCRIPTION

Additional information regarding leads, their use and market segmentations will be discussed below with reference to FIG. 1B. However, given that the present disclosure is a continuation of, with additions (CIP) to earlier filed and above incorporated disclosures; this part of the description leaps directly into the more advanced subject matter of FIG. 1A.

Figure 1A:
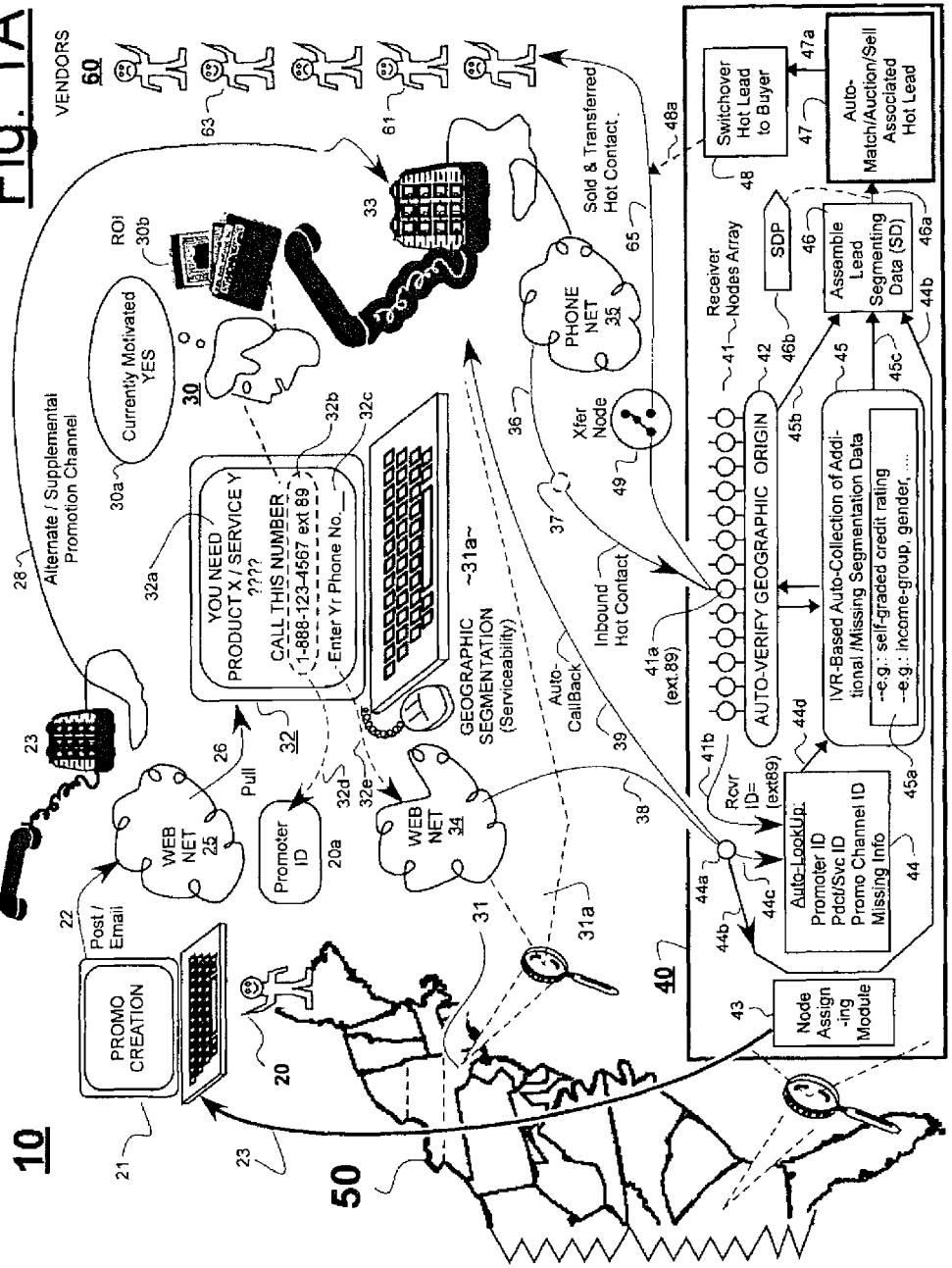
FIG. 1A is a block diagram of a hot-contacts interconnect system which includes a segmentation data assembly means in accordance with the disclosure.

FIG. 1A is a block diagram of a hot-contacts interconnect system 10 which includes on-the-fly, segmentation-data attaching means (e.g., IVR unit 45) in accordance with the disclosure. The segmentation-data attaching means is used for gathering segmentation data on-the-fly as a potential consumer 30 engages with the system 10 and navigates through one or more telecommunication pathways in route to connecting with a potential vendor (61) of sought goods and/or services. For purpose of example, item 50 represents a map of the Eastern part of the United States of America. A so-called sponsor, lead initiator, or lead developer/promoter 20 lives in a first state (e.g., Maine) and uses his local computer 21 to create one or more promotional schemes for causing contact-initiating, promotional material to be presented to potential consumers (e.g., person 30) who may be interested in buying or otherwise consuming a particular type or class of good, service or combination of goods and services. In one embodiment, the promoter 20 is responsible for using the Internet 25 (and/or other networking means) to generate promotional material such as one or both of promotional email messages and promotional web page postings 22 such that their content can come to appear on the computer screen 32 of a potential consumer 30. When creating this promotional material, the promoter 20 is instructed in one embodiment, to include patch points in the promoter's software 21 into which a leads processing station 40 can dynamically seed specific telephone numbers (e.g., 32b) so that either the consumer (e.g., 30) will be instructed to call one of those seeded numbers or that the promoter will transfer a consumer's call to one of those seeded numbers. Connection 23 represents a dynamic insertion by module 43 in station 40 of one or more specific telephone numbers into the promoter's promotional material 21. (Connection 23 is not the only way that a potential consumer 30 can be guided towards participating via a special telephone number, i.e. 32b in a live phone call that is controlled by processing station 40. Any of a variety of techniques may be used for guiding a pre-classified consumer into participating in a live telecommunications interaction that passes through a node having segmentation data pre-associated with it as will be better understood below.)

Typically, after having been exposed to a traffic-attracting or contact initiating part of the promoter's promotional material (e.g., a free search engine feature), the consumer 30 will be induced to pull (step 26) corresponding email and/or web page content onto his computer 32 by for example clicking on a promoter-supplied URL or other hyperlink (not shown) or by activating a presented menu item. The content which then appears on the consumer's computer screen is generically represented at 32a as conveying a message like: "You need product X and/or service Y?" The X and/or Y of the promotional content 32a can refer to any of a host of products or services by class and/or by specifics (brand, model number, etc.) such as, for example, a particular type and/or brand of automobile coupled with a particular automobile leasing program.

If the promotional content 32a is successful in inducing the consumer 30 to currently think, "Yes, I do need this product and/or service now" (which current frame of mind of the consumer is represented by thought bubble 30a), and the consumer is ready to talk or otherwise converse in live fashion about that desire now, then the content may further prod the consumer 30 into performing one or more further steps such as: (a) calling at least one of specific, seeded telephone numbers 32b (e.g., the toll free number 888-123-4567 extension 89; where the number given here is representative of a number uniquely selected by module 43 of station 40) or (b) entering one or more of his own telephone numbers (e.g., home and cellular numbers) at location 32c or (c) filling in a web based application form (not shown) where the application form asks for one or more pieces of information that will define segmentation data (as set forth below) or (d) a combination of two or more of steps (a)-(c). The consumer-provided information may include an indication of best times to try and contact the consumer if now is not a good time.

Assume first that the consumer 30 chooses to use step (a) alone, namely, using his local telephone 33 to call the supplied specific telephone number presented at 32b. That means that the consumer is available now, at the calling moment chosen by the consumer, to talk with a potential vendor. Unbeknownst to the consumer 30 (typically unbeknownst), the supplied telephone number 32b is a unique one which station 40 automatically seeded (23) into the promoters promotional material. In the station 40, this supplied telephone number 32b or node has been logically pre-associated with the identification number 20a of the corresponding promoter 20 and/or with the mix of products (X) and/or services (Y) presented at 32a. So the system-supplied specific telephone number 32b logically links the in-calling consumer 30 to at least one of the pre-identified promoter or sponsor 20 and a pre-identified mix of products (X) and/or services (Y) 32a. The consumer's inbound telephone call 36 flows in the schematic through the public telephone exchange network 35, and optionally through one or more intermediary telecommunication nodes 37 before passing through a pre-assigned classification pathway or node 41a (e.g., identified as "ext. 89") in the call processing station 40. Node 41a is one of an array 41 of logical voice call receiving nodes within the call processing center 40. (These do not have to be physically separate nodes and can instead be logically defined nodes that are defined by unique telecommunication session numbers and/or logical pathway numbers.) For purpose of example, it is assumed that the call processing center 40 is located in a different state (e.g., Georgia) than the residence state of the promoter 20 or the consumer 30. This may have legal ramifications as to what jurisdiction of laws the inbound call 36 falls under and the call processing center 40 may automatically process the call differently based on this information (e.g., playing a different IVR greeting script based on geographic locations for example of the potential consumer, the sponsoring promoter and the type of service or property involved). Because the inbound call 36 comes in through a uniquely-identified pathway or node 41a with pre-assigned segmentation information attached to it, the system 40 automatically determines from the identity of node 41a that the inbound contact was induced by the promotional material(s) and/or promotional activities of the specific promoter 20 (e.g., living in Maine), and that this inbound contact 36 is directed to a specific product X and/or service Y as has been presented in field 32a of the consumer's computer screen (or other promotional material); and perhaps also that this inbound contact was induced by a specific one of plural promotional channels that the sponsor 20 uses for luring in potential consumers for the X/Y product/service mix. The system 40 may automatically feed back to the promoter's computer 21 information about how many hits per day node 41a is experiencing. The same promoter may have another node (e.g., 41c, not so identified) in the array 40 which is logically linked by the station to a different promotional scheme (e.g., 28) and receives a different number of hits per day. By tracking calls to each his nodes and comparing the number of hits received by each of his different promotional schemes, the promoter may be able to adjust his behavior over time to better match the fluctuating whims of the consuming public (e.g., 30).

Array 41 of receiver nodes (or logical pathways) may include hundreds or thousands of uniquely numbered telecommunication channels (e.g., telephone connections) each one specifying (at least for a given period of time, e.g., a day, a week, a month) a particular promoter, a particular one of his plural promotion channels, and/or a particular mix of product(s) and/or service(s). The station 40 can reassign different roles to its under-control bank of nodes or pathways 41 over time as some promoters choose to no longer participate in the system and new ones join and the mix of goods and/or services covered by participating lead buyers changes over time. The assignment of specific nodes 41 to specific promoters, promotion channels and products may be performed by module 43 (node assigning module) on a rolling bank basis over time where some banks of telephones (or other live telecommunication pathways) are left blank and unused from time to time so as to allow new promoters, channels and/or products to be added into service, and/or to flexibly vary bandwidth allocated to different promoters/products as demand fluctuates and/or also to weed out inbound calls that have not resulted from a current system-acknowledged promotional activity such as 32a or have resulted from stale and obsolete promotional material. In one embodiment, if the node is deemed currently obsolete, a taped message automatically plays back to the caller (30) explaining that the promotional material appears to be obsolete and directing the caller to a web site or other automated informational means, or optionally to a human operator, so that the caller can connect with an appropriate active one of the plural nodes in array 41.

In the example of FIG. 1A, the targeted consumer 30 happens to live in a particular geographic area 31 as is magnified by geographic segmentation symbol 31a. For some vendors, this information 31a regarding geographic segmentation will indicate that this consumer is not serviceable by them; because for example they only service consumers living in the Northern part of New York State. The corresponding lead will be worthless to them (actually it will have negative value) because they cannot service this consumer and trying to do so will waste their time as well as that of the potential consumer 30. In order to obtain the geographic segmentation information 31a, the promoter's promotion scheme 21 may have caused the consumer to navigate through another web screen (not shown) prior to the illustrated 32a-32b for isolating the geographic location of the consumer. For example, a previous web page may have said "If you live in lower New York State, click on this hyperlink to see a limited-time good deal for product X; if not click on this other hyperlink to see other available deals." Given that the consumer clicked his mouse on the URL associated with lower New York State to navigate to the illustrated 32a-32b presentation, the promotion-supplied specific telephone number 32b is seeded into the navigated-to web page so as to automatically identify the geographic segmentation of the consumer 30 as being lower New York State for example. When the call processing center 40 detects that the number seeded at 32b was used, the center 40 automatically determines therefrom that the consumer's location is lower New York State because module 43 of the center 40 has already pre-assigned that geographic segmentation to that seeded number 32b at least for a currently associated time period (e.g., an hour, a day, a week). Two months from now, after promotional material 32a is stale, the same number 32b may be re-assigned by module 43 to different item of inheritable information.

If an alternate pathway is used and the consumer 30 is instead or further been induced to enter his telephone number (with area code) at line 32c of the web presentation, the area code and/or other digits of this entered telephone number may be passed through web connection 34 into node 44a of the data processing center 40 and used to isolate the geographic location of the consumer. Thereafter, the acquired geography information is assigned by module 43 to a unique pathway (inbound 36 or call-back 39) by way of which the consumer will be asked to participate in a live chat with a potential vendor (e.g., 61). In either case, when a customer-bearing call 36 or 39 passes through one of the information-assigned pathways (e.g., segmentation nodes of array 41) and the processing station 40 detects the use of such a pre-identified and pre-assigned pathway, the station can responsively attach corresponding geographic location data to a forming segmentation data package (SDP 46b) associated with the call. One embodiment of system 40 includes a caller-ID means 42 for reading the telephone number of the call-originating telephone set 33 for verification or data gathering purposes. If the caller's telephone number is discernible with such a caller identification system 42, this information may be used to automatically verify the geographic origin of the caller and/or to establish the geographic origin for purpose of generating segmentation data and assembling that data into a completed segmentation data package 46*b*. In one embodiment, packaged segmentation data (46*b*) includes a flag indicating whether the consumer's phone number has been verified by either a caller ID mechanism (42) or a callback mechanism (39).

Thus far in the described example, the call processing center 40 has automatically ascertained the promoter's identification number 20*a* and the generic product X and/or service Y which the consumer is interested and the geographic location of the consumer due to the call coming through a specific pathway or node (e.g., 41*a* of array 41). In some instances, this information alone is sufficient to complete assembly of a package 46*b* of so-called segmentation data that is next to be transmitted as an appropriately formatted signal of predefined format to a leads-versus-profiles matching system 47. If that is the case, then IVR-based step 45 is bypassed and the collected information is forwarded by path 45*b* to the segmentation data assembling means 46 for forming a correspondingly completed and formatted SD signal package 46*b* and for logically attaching package 46*b* to the live call on pathway 36 (and node 41*a*) prior to its submission to the matching system 47. On the other hand, if some portion of the needed or desired information for the SD package 46*b* is still missing, this situation may be detected by an automated lookup means 44 that determines whether there is any missing information to be still collected as a result of the call having come in through a specific pathway or node and/or as a result of a web form having been received via path 38 where the form is incompletely filled in and/or of a type that does not gather all necessary or desired data. In one embodiment, the identification of the call-carrying pathway or node 41*a* (e.g. ID equals ext 89) is transmitted by way of path 41*b* to the lookup means 44. In response, the lookup means 44 generates IVR control instructions 44*d* for submission to an IVR-based automated data collection means 45. The IVR-script used for collecting the missing information is selected on the basis of the IVR control instructions 44*d*. In one embodiment, receipt by a given node (e.g., 41*a*) in array 41 of an inbound call 36 indicates that identification of the promoter 20 is already-determined and that the general product X or service Y is also already-determined as well as perhaps identification of the promotion channel (e.g., 26, 28) that was used to induce the call 36 to come into the center 40 by way of the specific receiver node (e.g., ext 89) but that it does not yet determine customer credit rating for example. The IVR unit 45 may be instructed by control signals 44*d* to next collect this missing customer credit rating.

In so far as multiple promotion channels are concerned, it is to be understood that the email or web content pull operation 26 of FIG. 1A may constitute but one of plural promotion channels used by specific sponsor 20. The same promoter 20 may deploy a number of different promotional schemes, including but not limited to a manned telephone advertising center that calls potential consumers such as 30 by telephone link 28 and solicits segmentation data from such consumers in this alternate or supplemental way. One or both of the sponsor 30 and operator of the call processing center 40 may be interested in discovering which of plural promotional techniques (e.g., 26, 28) works best for certain products, services, consumer demographics and so forth. The call processing center 40 may collect statistical information for this purpose by assigning different pathways or receiving nodes 41 for indicating respectively different promotion channels and culling the statistical information regarding which promotional techniques work best from the pathways followed by higher rated leads (e.g., leads that conclude with a closing of a corresponding deal). The channel performance information may be fedback to the promoter 20 so that he or she can fine tune one or more or more of the promotional schemes 21 used by the promoter to thereby increase rates of lead capture and rates of lead conversion (where capture and conversion are further described below). In one embodiment, the promoter 20 can log in to system 40 with use of a password and the promoter 20 can then program or change one or more IVR scripts that control how the auto-lookup means 44 will determine what segmentation data, if any, is missing or not and/or how the IVR unit 45 will respond to messages 44*d* from the auto-lookup means 44 regarding which node the call 36 came in over on and/or what segmentation data, if any, is missing.

The interactive voice recognition (IVR) means 45 uses the supplied lookup data message 44*d* to determine which one or more voice-based questions and/or greetings, if any, to next submit to the consumer 30 at the other end of the inbound telephone call 36 so as to keep the caller on line and collect the missing segmentation information. For example, if the service and product is one in the home refinancing sector, potential lead buyers may be interested in finding out what credit rating the potential consumer 30 has and/or what income group the consumer 30 belongs to. If this information has not yet been provided to the system 40 directly or indirectly by the consumer 30, the call-intercepting IVR unit 45 may prod the consumer 30 with a message such as the following: "We want to give you quality service and are almost ready to connect you to one of our loan experts. Please answer just the next two important questions: How do you grade your current credit rating? Please say 'Good' or press 1 on your touchtone keypad if good. Please say 'Fair' or press 2 on your telephone if fair. Please say 'Poor' or press 3 on your touchtone pad if poor. Please say 'Back' or press 9 on your keypad if you need to hear the last menu repeated . . . . Thank you. One last question: . . . ." After the consumer appropriately responds to the one or more of the additional questions presented by the IVR unit 45, the IVR unit sends the correspondingly collected information via path 45*c* to the SD package assembling unit 46 for packaging and formatting together with the promoter ID and the product or service ID already obtained by virtue of the identification of the call-receiving node (e.g., ext. 89). The packaged and formatted SD signal 46*b* (formatted for acceptability by unit 47) is then transmitted to the matching unit 47 for matching against profiles of potential vendors 60.

Aside from credit rating, the automated IVR unit 45 may ask the consumer for further information such as that regarding the amount of the refinancing loan being requested and the income/revenue group to which the consumer 30 belongs. In one embodiment, the IVR asks the potential consumer whether he belongs to one or more ranges presented as choices to the consumer. For example the IVR unit 45 may ask: 'If your annual income is less than $75,000 please say Less or press 1 on your keypad. If your annual income is between $75,000 and $125,000 please say Between or press 2 on your keypad. If your annual income is above $125,000 please say Above or press 3 on your keypad.' The range boundaries that the IVR presents (e.g., $75,000 and $125,000) may be fixed for a given period of time or they may be varied dynamically in response to one or both of promoter inputs and surveys conducted by the lead matching system 47. In one embodiment, the lead matching system 47 periodically scans buyer profiles (see FIG. 2) stored in its database and determines therefrom what segmentations (bands) of consumers the presently active buyers are mostly asking for by way of their on-file and active bid profiles (profiles of the most active, monetarily speaking, plurality of lead buyers). The lead matching system 47 sends this data to the IVR unit 45. In response, the IVR unit 45 every so often (e.g., once every 24 hours) adjusts the range boundaries that the IVR presents to in-calling consumers so as to better categorize the consumers according to desires of the lead buying population. More specifically, if a monetarily weighted majority of lead buyers for midrange home refinance loans signals via their profiles that this week they are seeking consumers with annual income in the range $95,000-$150,000 rather than $75,000-$125,000, then the IVR will readjust itself to present the former as the new 'Between' range. Otherwise the IVR will be capturing some consumers with insufficient incomes (less than $95,000 but more than $75,000) into its 'Between' range while leaving out some who earn more than $125,000 but less than or equal to $150,000. Of course, this information regarding change of requirements by the lead buyer populations may also be automatically distributed from station 40 to registered promoters of the system and/or automatically seeded by station into their promotional materials (e.g., online web forms) so that the desired segment of the potential consumer population is directed to the correct segmentation defining nodes. Promoters may individually tailor how the IVR 45 responds for leads associated with those promoters.

With regard to the segmentation data assembler unit 46, in its simplest form it merely gathers collected segmentation data into an appropriately formatted form for submission to a corresponding matching unit 47. In a more complicated form, the segmentation data assembler unit 46 is programmed to contain rules, lookup tables and/or mathematical derivation formulas for deriving segmentation data from collected answers. For example, if vendors of home refinance packages want their leads segments according to LTV (loan amount to value of property ratio), the assembler unit 46 carries the steps of verifying that it has received acceptable values for the loan amount and the value amount (e.g., not zero) and for performing the required division operation and thereafter perhaps converting the result into segmentation band indicator. Another example of how an assembler unit 46 may derive a segmentation band indicator is by way of logical rules. For example, if an insurance (health and/or life) policy is being pursued, some of the automated queries to the potential consumer may inquire as to smoking, drinking and dangerous sport activities. One rule based logic line may say: IF Smoker=Yes AND Drinker=Yes and SkyDiver=Yes THEN RiskCategory=High for example. By contrast another rule may say, IF Smoker=No AND Drinker=No and RegularExercise=Yes THEN RiskCategory=Low. Derivation of segmentation band indicators may be performed on a cumulative basis of positive or negative points and different weights assigned to different factors (e.g., current health, current lifestyle, chronic conditions, health lifestyle histories) and then added or otherwise combined together. Derivation of segmentation band indicators may alternatively or additionally be performed on a Boolean logic basis (e.g., IF A and B but not C then band=D). Segmentation band indicators may be deduced or inferred on a fuzzy logic, neural net, knowledge database or other basis from a collection of answers given by or gathered about the potential consumer (e.g., the consumers FICA credit score and history may be obtained independently on line and used to infer how much of credit risk this consumer is). In short, the assembler is programmable by operators of the processing station 40 so as to perform whatever set of simple or complex operations are needed for converting collected data into a complete and useable segmentation data package signal 46b.

Segmentation data that may be useful for completing a segmentation data package may include one more items from the following exemplary and nonlimiting list as applied to individuals or procuring organizations as may be appropriate:

(1) consumer/agent age (for testing to see, among other things, if above age of majority in legal jurisdiction of interest) or years procuring company is in business; (2) consumer travel habits (fly, drive and if so how many miles per year); (3) consumer's budget limits for contemplated transaction(s); (4) consumer's debt load; (5) consumer's distance from nearby commercial center or main city (in miles, 1 mile versus 200 miles); (6) consumer's driving history (e.g., number of speeding tickets, accidents, etc.); (7) consumer's family size or number of employees if consumer is a business; (8) consumer's experience level (e.g., with this kind of contemplated transaction, on the job experience, experience of family or company members); (9) consumer's household size (e.g., number of family members claimed as tax exemptions); (10) consumer's gender; (11) consumer's medical history (e.g., hospitalizations, chronic illnesses, current and past medications); (12) medical history of consumer's immediate family members or employees if a company; (13) consumer's income/revenue range (e.g., last full year, average of last 5 years); (14) job type or industry in which consumer works/operates (e.g., office versus hazardous chemical plant); (15) consumer's length of service in reported job (6 months, 5 years?); (16) consumer's legal history (e.g., lawsuits, bankruptcies, divorces, acquisitions, name changes); (17) consumer's highest level of formal education (e.g., high school, bachelor degree, post graduate degree?); (18) consumer's number of, age of and gender of children; (19) affiliate businesses owned by consumer and market valuations of those affiliate businesses; (20) number of employees in consumer's affiliate businesses; (21) other assets and types owned by consumer (e.g., house, condominium, limousine, private jet); (22) type of legal ownership (e.g., solo, tenant in common, trust, nonliquidatable); (23) value of collateral properties; (24) number of automotive vehicles owned by consumer and service records (e.g., oil change frequency); (25) industry sector in vertical or horizontal food chain where consumer operates (e.g., retail versus wholesale, tangible goods versus intangible service industry) and (26) consumer prediction of number of units and/or total expected monetary value of purchases to be made from potential vendor over current or next fiscal year.

Figure 2:
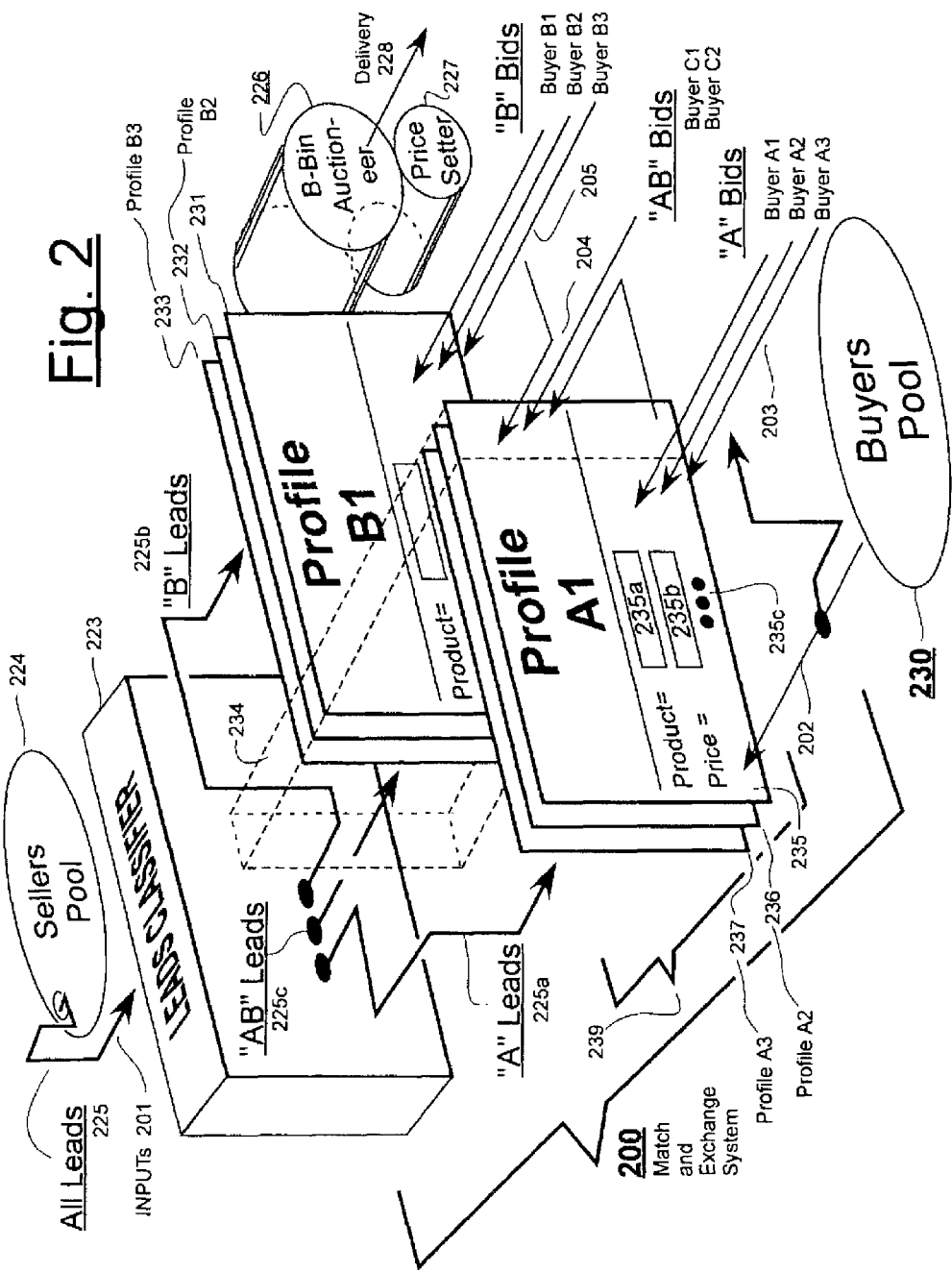
FIG. 2 is a perspective schematic showing a leads classifying and bids matching mechanism in accordance with the invention.

Once the various needed or desirable pieces of information are gathered (e.g., via link 45c), calculated, deduced or otherwise determined and they are within the SD packaging unit 46, the accumulated segmentation data 46b is deemed complete for that particular consumer 30 and ready to be forwarded to the seeker matching unit 47. In one class of embodiments, completion of an SD package is determined by two needs of potential vendors (60), namely, (1) is the lead serviceable by the potential vendor (e.g., 61) based on geographic location, product type and/or another serviceability factor, and (2) what is the probable return on investment (ROI) for that vendor (e.g., 61) if the vendor spends D number of dollars for acquiring the lead and T amount of time for trying to convert the lead into a closed deal (where D and T are vendor determined amounts that collectively define the highest bid the vendor is willing to make for the given lead). The serviceability question often turns out to have a yes or no answer. Either the vendor can or is willing to now service that type of lead or not This established by vendors (lead buyers) in their respective profiles (see FIG. 2). If the lead is unserviceable then it generally has no positive value for the potential vendor. The probable return on investment (ROI) question is often one having a variable amount as its answer and is reflected by how much potential vendors bid on each kind of lead. For some vendors it is important that the potential consumer 30 has a relatively high income (30b) and/or relatively low credit rating because this is the demographic group from which these vendors extract their highest revenues. For other vendors it may be desirable that the potential consumer 30 has a relatively low income and/or relatively high credit rating and that the amount of the transaction (e.g., a home refinance loan) be in a certain range because this is the demographic group that this other subset of vendors is organized to obtain highest profits from. Few leads are a sure thing. The lead buyers (e.g., vendors 60) cannot be certain that a lead will close even if the initial segmentation data is very promising. So the best that can be fairly asked for is a probabilistic or expected return on investment (how much will the vendor recover on average for having spent D dollars for the lead and T time for further developing the lead after purchase of the lead?). One of the factors that may help lead buyers in determining the probability of closing (and thus realizing the expected ROI) is the advertised quality of the underlying lead seller. In one embodiment, the matching system 47 defines lead quality on the basis of the identity of the lead seller 20 (which identity the system typically hides from the buyers) and the recent deal closing rates associated with that seller's leads. Some lead sellers may use promotional schemes 21 that capture leads with higher conversion rates (closing rates) than schemes of other sellers. It is in the interest of some groups of vendors to learn of the conversion rates associated with the leads they buy of different sellers and to pay higher premiums for leads from high-conversion-band sellers than for leads from sellers that are found (by system 47) to have lower average conversion rates. Accordingly, the value portion of a completed segmentation data package may contain a number of factors, such as but not limited to: consumer income bracket, consumer credit rating and seller average conversion rate (or ranking of seller as to the seller's conversion rate, which ranking can be determined by the seller's system assigned ID). The specifics of what constitutes SD completion or not can vary from application to application and may be dependent on what matching factors are included in the lead buyer profiles as will be better understood when FIG. 2 is described.

In one embodiment, during the brief interval (e.g., about 300-500 milliseconds) between when the completed SD package 46*b* is submitted to the automated matching system 47 and when a corresponding lead seeker/buyer is found, the IVR system 45 keeps the potential consumer on hold. If it turns out that a matching seeker/vendor is not immediately found or does not pick up at the other end within, say 3 or less rings, the IVR system 45 may ask the on-hold consumer 30 to "Please hang on for just a few more seconds while we connect you to one of our operators." During that interval, matching system 47 seeks out another matching vendor. More specifically, in one embodiment, if a first matching vendor (say 61) fails to pickup in about 1-3 rings, the call processing station 40 detects this event and then automatically rings the next highest and matched bidder (say 63) all while the consumer is asked by the IVR to hang on. If the second bidder 63 also fails to pick up then the call is transferred to human operators of the call processing center 40 so they can politely deal with the failure of matched vendors to pick up on leads they had bid on and won. Typically, potential vendors (60) who desire to not be part of the match-able set of lead buyers during a given time of day, or wish not to receive more than a capped number of leads per hour or day can manually or automatically deactivate or program their profiles accordingly so that their deactivated profiles (see FIG. 2) will not be part of the match set at undesirable times or after a capped number of leads are obtained. In this way, each lead buyer can control the number of leads they will be asked to process in a given time span so as to match the lead processing capabilities are of that lead buyer and/or to smooth out traffic flow of leads to that buyer.

Assuming a matching seeker (e.g., 61) is found after submission of SDP 46*b* to unit 47. Next, the identification of the matching lead seeker is passed by path 47*a* to voice switch actuating unit 48. In response, unit 48 actuates a transfer switch 49 that is controlled by station 40 by way of coupling 48*a*, thereby causing switch 49 to responsively continue or forward the momentarily on-hold call 36 from the classification pathway or node (e.g., 41*a*) it was pending on, to the winning lead bidder (e.g., 61) by way of path 65. The consumer 30 does not have to be aware that any of these background operations occurred and instead the consumer may perceive his inbound call 36 as having been almost immediately and seamlessly been connected or transferred to one of the operators 60 for further processing. The picking-up operator (e.g., 61) will appear to instantly know exactly what type of product (X) the consumer is seeking, what the geographic location (31*a*) of the consumer and/or property is and additional information which the consumer just supplied to the IVR unit 45. This is so because the so-called operator was pre-matched to that information by a profile the operator submitted and/or the information was automatically forwarded to the operator from the call processing system 40 via a computer link. In one embodiment, each lead buyer (e.g., 61) has a scrolling screen in front of him that is fed by a privately-accessed web page that shows the segmentation data of the latest one or more (e.g., up to a max of say the latest 5) leads passed to him by the match-and-transfer system (47-48). So by looking at the latest purchase, at pick-up time, the lead buyer sees the segmentation data attributed of the consumer 30 on the other end 33 of the line. The consumer 30 at that other end perceives himself as having received instant customized treatment at the moment when the consumer was ready to talk about the transaction and without the consumer being annoyed by having to repeat his desires (as to product, location, etc.) over and over again. In an alternate or supplemental embodiment, the operator (e.g., 61) has caller ID on his receiver and that operator's caller ID mechanism (not shown) shows classification node 41*a* as having been the origin of the call passed through switch 49. Module 43 will have seeded the operator's caller ID mechanism (not shown) with the segmentation data currently attributed to node 41*a*. As a result, the operator's caller ID mechanism (not shown) will display numeric or other code that indicates to the operator, the segmentation data that is currently attributed to the call forwarding node 41*a* from which he is receiving the latest hot-contact lead.

Of importance, it should be noted that the described process caused a currently motivated and available consumer 30/30*a* to be quickly matched, automatically and in real time (e.g., in less than about 1-10 seconds in one embodiment) to a corresponding operator (e.g., 61 or 63) who is knowledgeable about the product of interest and the specific needs of that consumer 30. The operator receives the hot switched call (switched by automated call-transfer switch 49) while the consumer continues to be in a motivated frame of mind (30*a*) and thus the operator (lead purchaser) has a relatively good probability of converting the inbound call (36) into a consummated deal (in other words, closing the deal). This can be contrasted to an alternate system in which the consumer is contacted back perhaps a few hours or a day later when the consumer is no longer in the same frame of mind due to intervening events or the potential consumer cannot make himself easily available to discuss the prospective deal. It's best to strike while the iron is hot, so to speak. The value of the hot transferred lead 65 is heightened by the speed and personalized way in which the consumer's inquiry is automatically handled such that the consumer is connected in the first instance to the appropriate vendor for the goods and/or services the consumer seeks. Segmentation data necessary or desired for matching the lead seeker/buyer to the interested consumer was collected on-the-fly during the process to developing the connection between the consumer and vendor, mostly due, in one embodiment, to the consumer having navigated through telecommunication pathways (e.g., web pages and then node 41a) that have one or more pieces of segmentation data attributed to them. Stated otherwise, the consumer 30 was not annoyed with being asked multiple times for the same information, and perhaps did not realize he or she was answering questions related to forming a segmentation data package 46b as the consumer was guided through one or more traffic filtering web pages (e.g., 32a) and into connecting to a specified telecommunications channel, pathway, or node (41a) just prior to being matched (47) to a vendor (61) that can service the consumer's interest. Most of the operation in finding a matching vendor may be transparent to (hidden from) the consumer 30 because the consumer probably did not know that the supplied telephone number 32b is a specially seeded one which automatically provides most, if not all of the needed segmentation information to the call processing station 40 for finding a matched vendor. The call processing station 40 is thus able to quickly determine or form the segmentation data package 46b that is to be submitted automatically to the lead matching unit 47 for automated matching of consumer 30 with a corresponding vendor (e.g., 61).

For purposes of yet another example based on FIG. 1A, assume that instead of calling or even being given the specific, seeded telephone number 32b, the perspective consumer 30 decides or is enticed into entering at least one of his unique phone numbers (e.g., home number, cellular number, work number) at line 32c of the presented screen 32. The web-based application that receives the entered telephone number 32c processes this information together with the identification of the product (X) and/or service (Y) given at 32a and the identification of the promoter (as for example identified by 32b or just the overall content 32a) and submits all these pieces of information by way of path 32e and web connection 34 to another specified receiving node 44a of the call processing center 40 (also specified by module 43). In response to the data arriving at this specified receiving node 44a, the call processing center 40 of one embodiment automatically determines who the promoter is and/or what the product mix is. The call processing center 40 logically links the consumer's unique telephone number (as entered at 32c) to the segmentation data acquired thus far from the consumer having navigated by way of network pathway 38 to node 44a. In response to the data package received via network connection 38, the lookup means 44 automatically determines whether there is any missing information which still needs to be gathered to finish assembly of a corresponding segmentation data package (SDP) 46b. If no, then bypass path 44b is taken directly to the SD packaging unit 46 and the corresponding segmentation data package 46b is assembled (into an interoperative format) from the information collected thus far and sent to the automatic matching unit 47 for finding a match. At the same time, or slightly before, an automatic callback is placed from node 44a back along path 39 to the consumer's given telephone number (say it is to phone 33). Assuming the consumer is then available to answer, when the consumer responsively picks up the telephone 33 in one embodiment, he hears the IVR system 45 announcing something like: "Please hold on for a moment and one of our operators will be with you shortly to process your request. If this is not a convenient time, please press 2 on your touchtone keypad or say 'Later' and we will call you back later." Shortly thereafter (e.g., within 1-10 seconds) if the consumer did not respond with 'Later', or a press of 2, one of the winning lead bidders (e.g., 61) is transferred by way of switch 49 and node 44a (connection not shown to avoid illustrative clutter) to pick up the hot contact and continue processing that hot contact, namely the one which was established by way of the automatic callback path 39. If the consumer said 'Later', the winning bidder (e.g., 61) will be given this information so that the bidder can try a separate callback about 10-30 minutes later via node 44a and then to node 33. (In one embodiment, the vendor is blocked from calling directly to node 33 and must call through the call processing station 40—i.e. through node 44a—so that the station can keep track of all vendor-to-consumer connections made or not timely made.)

If the consumer does not pick on a first callback attempt to the provided callback number (32c), then under one embodiment, an automated predictive dialer is used to try that number at various further times until the consumer does pick up. If the consumer indicates he is ready to talk (or does not indicate he is unwilling to talk, for example by immediately hanging up) the associated segmentation data package 46b for the callback number is sent to the matching unit 47 and a matching vendor is found for the now available consumer. Such a callback option allows a motivated consumer 30 to be timely reached by a matched vendor (61) without being unduly annoyed at times when the consumer is not willing to talk. In one embodiment, the web form that asks for the consumer's callback number (32c) also asks about best times to call back (e.g., now, during lunch, after dinner or specify). This information is passed along to the predictive dialer (not shown) so that the dialer's chances of connecting with the consumer are improved. In a slightly different variation, when a batch of callback numbers are obtained for substantially similar leads (same product, price, etc.), the matching lead seeker/buyer is found first (e.g., 61; or 63 if vendor 61 fails to pick up in a system allotted time), switch 49 makes a connection between the found vendor and node 44a, and then the callback 39 is made from node 44a of the center 40 to the node 33 of which ever pre-matched consumer is next available white the found seeker/buyer remains on the line. So that when the next available consumer 30 picks up at his phone 33 (could be a cell phone or wireless PDA rather than a wire based set), the seeker/buyer is already there and can instantly begin to converse with the interested consumer 30 about the subject good and/or service that was presented in screen portion 32a of the consumer's presentation means (e.g., a computer screen). In both instances, (predicative dialer or sequential callback through a batch of substantially similar leads while seeker is already on line) an automated and persistent attempt is made by a machine means to join a matched vendor and a willing plus available consumer in a live telecommunications interaction so as to thereby improve the chances that the desired deal close (consummate) for both parties in a mutually satisfactory way.

For purposes of yet another example based on FIG. 1A, assume that the web supplied data package sent over connection 38 was not enough to complete assembly of the segmentation data package 46b needed for a match and that the auto lookup unit 44 automatically determined there is still a certain piece of missing information which is needed to make the segmentation data package 46b complete (e.g., for purpose of demonstrating one or both of serviceability and expected value to the potential vendors 60). In such a case, an indication of what information is missing is passed by way of path

44*d* to the IVR unit 45. The automatic callback 39 still takes place to the consumer's telephone 33. However, in this case, if the consumer is available and ready to talk, the IVR 45 intervenes first and announces to the picking-up consumer "Thank you for your request. We just need one more piece (—or a few more pieces—) of information before you can be connected to one of our operators. Please grade yourself as to credit grading by saying 'Good' or pressing 1 on your touchtone keypad if you consider your credit rating to be good. Please . . . ." Just as in the earlier example above, the IVR unit 45 collects the missing information by way of the callback hot contact connection 39 so that it can supply the missing data to the SD package assembler 46. When the consumer 30 finishes providing the missing information, the completed SD package signal 46*b* is automatically passed by way of path 46*a* to the automatic matching unit 47 and the correspondingly matched operator (lead seeker/buyer, e.g., 61) is switched in by means of hot contact transfer switch 49. If the consumer is not able to provide the missing information to the automated IVR unit 45; for example because the consumer does not understand the question posed, the IVR unit 45 automatically activates the call forwarding switch 49 to forward the call to a human operator at the call center 40 for better servicing of the potential consumer. Most inbound calls 36 or called-back calls 39 will transfer automatically to a matched vendor (e.g., 61) without need for intervention by a human operator at the call center 40. For those few calls that do need human intervention, the call center can have a small staff of a few operators to politely manage the small amount of traffic that the automated call processing devices (e.g., 44, 45) cannot handle on their own.

In yet another variation, prior to reaching one or the other of screen inducements 32*b* and 32*c*, the potential consumer 30 is first asked to fill out an application form on the Internet specifying the information needed for assembling a segmentation data package for a corresponding product or service sector (e.g., home refinancing). This consumer-entered data passes by way of network path 38 into the system 40 and the lookup means 44 tests each incoming form to determine whether or not the form was fully filled in. Then, depending on choice by the processing center 40, the next on screen presentation asks the consumer 30 either to call the special seeded telephone number at 32*b* or to enter his phone number at 32*c* and receive a callback 39. In either case, if lookup means 44 determines there was missing information, then the IVR unit 45 is activated to intervene before a matched vendor is sought and to collect the missing information. Otherwise, the collected information is assembled into an appropriately-formatted, segmentation data package 46*b* and forwarded to the matching unit 47. A matching lead seeker is then found and the connection between consumer 30 and the matched lead seeker is automatically formed via switch 49.

Figure 1B:
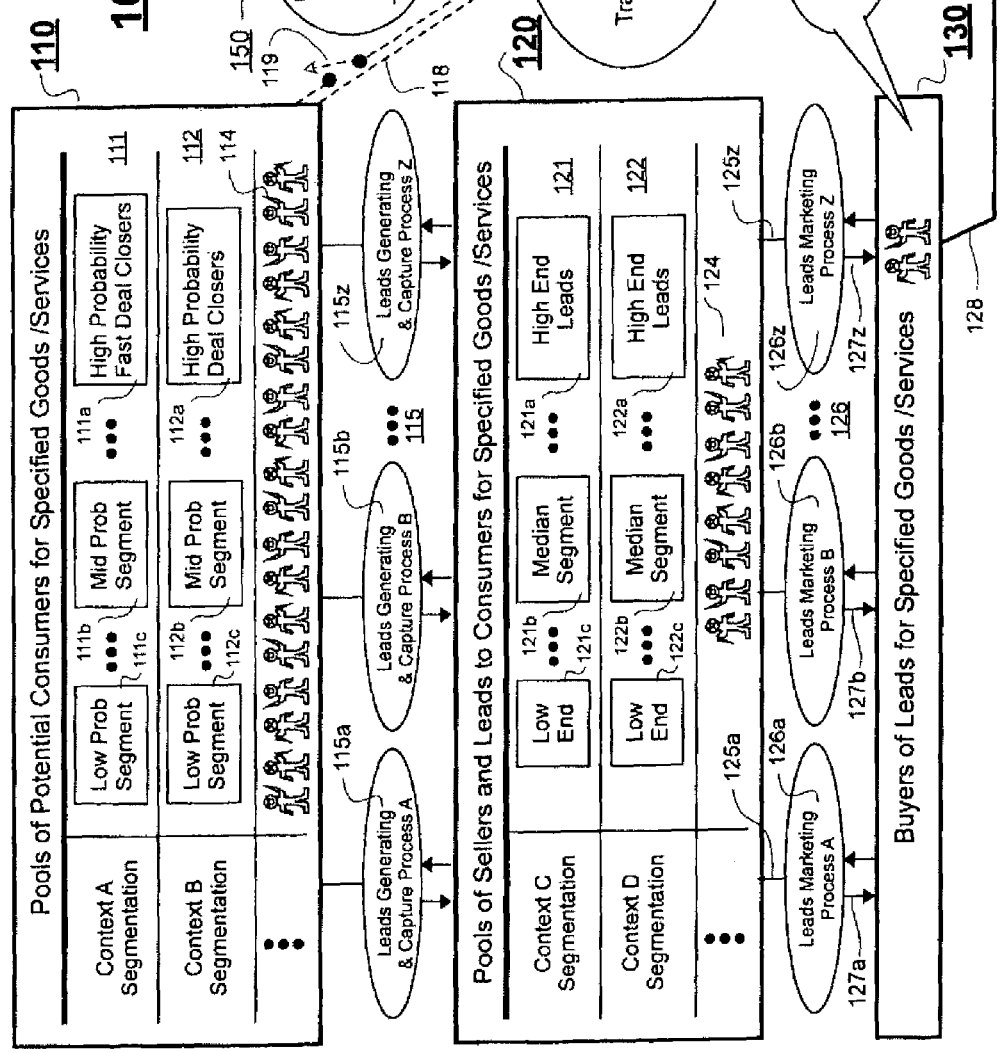
FIG. 1B is a block diagram of a vertically organized marketplace for generating leads, selling leads, buying leads and exploiting (converting) the purchased leads.

FIG. 1B is a block diagram for providing additional background information on the vertically organized marketplace 100 which includes a leads-generating activity layer 115, a leads-selling and buying activity layer 126, a leads delivering activity layer 128, and a leads-exploiting (converting) activity layer 140-150.

More specifically, a pool of all practically reachable consumers for each given good X and/or service Y (the product) is represented at 110. This pool 110 may be segmented in any of a variety of ways depending on product, price range, serviceability, expected return on hot-contact efforts, and/or other context-dependent parameters. The context-dependent parameters may include, but are not limited to: (a) the associated class or range or mixture of products involved (e.g., automobile, loan refinance service, perishable fruits, etc.); (b) the price range of the product bundle; (c) the longevity of the lead, meaning how long the prospect for closing a deal remains viable (e.g., must be done within the hour, a day, a week, 3 months, a year, etc.); (d) the geographic location of the prospective consumer; (e) the financial well being of the prospective consumer (e.g., credit rating); (f) motivation of the prospective consumer to soon close the deal; and so forth.

Assume for example, that context A (111) is defined as a search for all prospective customers for a loan refinancing service (ReFi) in the loan range of $500,000 to $1 million dollars where the potential consumers satisfy certain pre-qualification criteria including an "excellent" pre-qualified credit rating. (The excellent credit rating indicates that the refinance application can pass bank scrutiny quickly and the deal can be closed quickly so that the refinance service vendor is paid in short time.) Under this first context, A (111), the total pool 110 of possible consumers may be segmented for example, to include a high-end segment 111*a* populated by very qualified potential consumers that have a comparatively high probability of closing on such a deal very quickly if connected with a corresponding vendor of high quality refinancing services at the moment. A median, second segment 111*b* may be defined under first context A (111) as being populated by prospective consumers of moderately qualified potential that have a comparatively medium probability of closing on such a deal in say, 6 weeks or less. Finally a low-end, third segment 111*c* may be defined as being composed of poorly qualified potential consumers that have a comparatively low probability of timely closing on such a deal if contacted by a corresponding vendor. Segmentation boundaries may shift from week to week or at other time intervals. One subclass of vendors may want access only to members of this week's high-end group 111*a*. Another subclass of vendors, surprising as it may seem, may desire to have access only to members of group 111*c*. But what are each of such vendors willing to pay for a lead to a possible member of group 111*a* or 111*c*? What if a lead points to a member of group 111*b* rather than to desired 111*a* or 111*c*, has the respective vendor been cheated in buying a lead he thought pointed to a member of group 111*a*/111*c*, and if so to what extent? Should the lead seller pay something back for having sold a somewhat defective lead? How can such a system be fairly administered?

Assume further, a second context, B (112) which is defined by a search for all prospective customers for a low priced automobile. The pool segmentation may then become entirely different as to which members of the reachable population 114 fit into the high-probability; fast deal closing segment 121*a*, the medium segment 121*b* or the poor-prospect segment 121*c*.

It is left to the ingenuity of lead originators or promoters to devise their own methods for generating promotional material (e.g., 21 of FIG. 1A), attracting potential consumers (30) to pay attention to the promotional materials, to capture live leads (initiate contact) and then stream the live or older leads to potential buyers of such leads. The various lead generating processes are individually denoted as 115*a*, 115*b*, . . . , 115*z*; or collectively as 115. Certain lead originators may wish to keep their lead find and capture methods proprietary. Examples of origination methods may include, but are not limited to: (a) cold calling prospective consumers via a manual or automated call centers (e.g., channel 28 of FIG. 1A), (b) offering prizes via mass-transmitted emails, (c) operating prospect-attracting web sites such as portals, free search engines, free game sites, etc., that attract the desired kinds of persons to the site such that the visitor can then be directed to a site where the visitor is encouraged to fill out a lead generating form and/or call the special number represented at 32b of FIG. 1A; (d) culling through long lists provided by other lead generators so as to generate shorter and more reliable lists with appropriate segmentation data (usually partial data) attached thereto; and (e) advertising via broadcast media (e.g., TV, radio, RSS feeds) and/or via print media (e.g., billboards, magazines, newspapers).

In layer 120, various members of the leads-gathering and initial selling group 124 have each acquired rights over one or more leads by virtue of their promotional activities which they now offer to transfer to prospective lead buyers (or resellers) for a negotiable amount of compensation. The size of the leads selling population 124 is often much smaller than the size of the potential consumers class 114, but nonetheless the size of group 124 and their offerings can be sufficiently large to still pose a significant challenge to the lead seekers/buyers 130. Lead buyers may not wish to sift through various subpopulations of lead sellers and various subsets of each of their offered leads in order to determine which bundles of leads are probably worthwhile making a bid on and which are not, and for how much. Instead the lead seekers would prefer to have that done for them (transparently if possible) so they can focus on the job of converting good leads into closed deals. The methods by which buyers find the leads offered by sellers (or vice versa, the sellers finding the buyers) and negotiate prices for the offered leads are individually denoted as 126a, 126b, . . . , 126z; or collectively as 126.

It is at this procurement layer 126 that buyers and sellers often run into problems. Some leads have very short life spans and need to be acted on quickly before they become stale (i.e., on-hold hot telephone leads). Some leads are long lived and the seller is in no immediate rush to quickly unload all of his or her offerings, especially if they are high quality ones.

Ignoring for a moment the problems of the leads buying and selling layer 126, the present description of FIG. 1B continues up the vertical market chain. Once a sale-of-lead is negotiated and closed on, the lead is delivered via pathway 128 to a product vendor 135 or an agent of that vendor. Full delay for lead delivery may be deemed to include the delay (e.g., 125z) for offering the lead during or after its capture (115z) as well as the delay for negotiating a price for the lead (e.g., 126z), the delay (e.g., 127z) for transferring the lead from seller to buyer and the delay for transferring 128 that bought lead from buyer 130 to vendor 135, if the latter two parties are not the same. In many cases, the vendor or vendor representative 135 is the last buyer in a chain of possibly multiple, buy and sell transactions for the given lead.

At step 140, the vendor who is in possession of the lead either continues hot contact (118) with a prospective consumer (114) that the lead processing center (40) has on hold on the phone or through another hot contact communications means; or the vendor reestablishes a callback contact (119) with the prospective consumer so as to attempt to convert the purchased lead 127a, 127b, . . . , 127z into a consummated business transaction (a selling of the vendor's product). Fork-in-the-road symbol 145 represents the fractions or percentages of leads on average that are successfully converted (150) versus those that become dead ends 149 for any of various reasons (i.e., failed to make contact, change of mind, not interested, etc.). Dead end leads 149 represent loss of time and money expended in trying to convert the lead and therefore may be associated with a negative value to the vendor. Converted leads 150, on the other hand, often; but not always represent a net gain to the vendor, where the exact amount of gain may vary depending on the extent to which the lead had been developed before purchase and the amount of revenue realized from the consummated vendor-consumer transaction 150. The positive or negative outcomes (and percentage of occurrence) of possibilities 149 and 150 can be used to define the average value 155 of the total of purchased leads to the given vendor. Some leads are of relatively high value to the given vendor because they have a high probability of converting into a very lucrative transaction 150 for that given vendor 135. Others leads may be of much lower value because they have low probabilities of conversion and/or low pay offs even if converted. The vendor has to make that assessment on his or her own because a same lead may have different values to different vendors (lead buyers). One measure of lead value can be cost-per-close where the total spent on leads by a vendor is divided by the number of successful deal closures in a predefined time period (e.g., day, week or month).

FIG. 2 is a perspective schematic showing a leads-and-bids managing system 200 in accordance with the invention. Where practical, like reference numbers in the "200" century series are used for elements of FIG. 2 which correspond to, but are not necessarily the same as elements represented by similar reference numbers of the "100" century series in FIG. 1B. Thus, sellers pool 224 (top left of FIG. 2) corresponds to pool 124 of FIG. 1B. Buyers pool 230 (bottom right of FIG. 2) corresponds to pool 130 of FIG. 1B.

The leads/bids match and exchange system 200 includes a leads receiving means 201 for receiving streams of lead-defining data structures 225 from the sellers pool 224. These received streams include the segmentation data package signals 46a of FIG. 1A. The matching system 200 also includes a profiles receiving means 202 for receiving bid profile structures (or specifications therefore) from the buyers pool 230. Received or otherwise specified profiles are stored in a profiles storage area 239 of system 200.

A first seekers profile, A1 is schematically shown as an example at 235 and represents profile data stored within storage area 239. As further seen, the first profile data structure includes a product defining region or field 235a in which one or a first range of products are defined. The A1 seeker profile 235 may further include a price or value defining region or field 235b in which one or a range of vending prices or property values are defined for the product bundle specified in region 235a. The A1 profile 235 may further include other profile attributes 235c for specifying desired characteristics of prospective consumers and/or prospective lead promoters and/or of other aspects of a desired vendor-consumer transaction related to the product(s) specified in first region 235a. A first buyer of pool 230 is designated as buyer A1 and is understood to be a selector, supplier and/or creator of the first sample profile 235 (the A1 profile).

A second buyer of pool 230 is designated as buyer A2 and is understood to be a selector, supplier and/or creator of a second profile 249 whose transaction-describing fields (not shown) substantially match the product (235a), price/value (235b) and other (235c) transaction-describing fields of first profile 235. Similarly, a third buyer of pool 230 is designated as buyer A3 and is understood to be a selector, supplier and/or creator of a third profile 237 (Profile A3) whose transaction-describing fields (not shown) substantially match the transaction-describing fields 235a-235c, etc. of the first and second profiles 235-249. Because of this substantial overlap of field data, profiles A1, A2 and A3 will be competing with one another for acquisition of leads that substantially satisfy (match) the transaction-specifying or requisitioning fields 235a-235c of the first and other profiles 235-237. In one embodiment, a same buyer can have multiple bids, for example A4a, A4b, and A4c (not shown) all from buyer A4 and all logically placed in the Profile-A stack 235-237. The system checks for such a condition, and if multiple bid profiles of buyer A4 beat out other bids, the system automatically rejects the excessive higher ones of A4's bids so that A4 does not end up bidding against himself. In other words, the process ensures that if a single buyer/lead-seeker has multiple profiles defined that can win, the lowest exclusive or nonexclusive bid price is declared as the winner(s) of respective exclusive of nonexclusive contests—buyers don't bid against themselves in the embodiment.

It is to be noted that profiles do not each need to contain all the data that categorizes them relative to the segmentation data of incoming leads. In some cases, product bins may be created for separately storing profiles for Product-X, Product-Y, Product-Z and so forth. Within each of the product bins, say the Product-Y bin, further subdivision bins may be created for separately storing profiles designating vending price Ranges YR1, YR2, YR3, etc (or property value ranges). Within each of the price/value range bins, say YR3, further subdivision bins may be created for separately storing profiles designating prospective consumers of excellent, good, fair and poor attributes. Accordingly, each profile data structure need not store such broad categorizations and may instead merely store or point to a bid price (e.g., 203) and may identify the corresponding bidder (e.g., A1 ). Leads may be matched into the major and minor storage bins of the profiles according to the corresponding attributes of the leads.

A leads classifying means 223 is operatively coupled to input port 201 for sorting among the segmentation data signals of received leads of a given time span and for logically allocating the received leads to auction bins corresponding to matching ones of submitted bid profiles, i.e., profiles A1-A3 (235-237). Thus some of the incoming leads 225 will satisfy the transaction specifications of only the "A" profiles in storage area 239 and this first subset of leads will be designated by classifier 223 as the "A" leads 225a for the given bidding or auctioning period. (In one embodiment, bidding and/or auctioning occur in substantially real time, meaning that leads tend to be sold, if at all, roughly within 50 milliseconds or less after each valid lead is received and validated.) Others of the incoming leads 225 will satisfy the transaction specifications of only a "B" set of profiles (231-233) held in storage area 239 and this second subset of leads will be designated by classifier 223 as the "B" leads 225b for the given auctioning/bidding period. Yet others of the incoming leads 225 may satisfy the transaction specifications of both the "A" profile set 235-237 and the "B" profile set (231-233) and this third subset of leads will be designated by classifier 223 as the "AB" leads 225c. Simultaneous satisfaction of both the "A" and "B" profiles is possible because each profile set can specify ranges of product(s) (i.e., 235a) and/or prices (i.e., 235b) and/or other attributes (i.e., 235c) and these unitary or range specifications may have areas of commonality or overlap. Phantom region 234 represents the overlap domain or bin of the "A" and "B" profiles (231-233 and 235-237). Note that classification occurs on a per-auctioning period basis. Bid profiles can change from one auctioning period to the next. Thus there may not be any fixed classification boundaries for use by the leads classifying means 223. The classification boundaries can dynamically change as various bid profiles are brought into play (activated) or taken out of play (deactivated) within the system.

Regarding the "B" profiles, 231-233; these are understood to have been selected, provided and/or created by respective buyers B1-B3 of the buyers' pool 230.

During or prior to a specified auctioning or bidding period, respective buyers A1, A2 and A3 will submit bid specifications 203 for leads satisfying their respective profiles, 235-237. Respective buyers B1, B2 and B3 will similarly submit or have submitted bid specifications 205 for leads satisfying their respective profiles, 231-233. Although not shown, buyers C1 and C2 may have submitted respective profiles fitting into the AB overlap region 234. During or prior to the specified auctioning/bidding period, these respective buyers, C1 and C2 will similarly submit bid specifications 204 for leads satisfying their respective profiles in overlap zone 234.

During an active auctioning or bidding period, a bids-and-leads matching mechanism (not specifically shown) plays the received and stored leads (as represented by their identifying and segmenting data) against received and stored bids in respective auction bins or buckets to determine which bid or bids are the winners. "A" leads 225a are played against the "A" bids 203 of the profiles 235-237 to which the "A" leads 225a were matched by the classifier 223. "B" leads 225b are played against the "B" bids 205 of profiles 231-233. "AB" leads 225c are placed into play not only with the "C" bids 204 of overlap zone 234 but also with the "A" bids 203 and the "B" bids 205. An auctioneering mechanism (i.e., 226) is instantiated for each matched bundle of leads. For simplicity sake, consider first the "B" leads 225b that were matched only to the "B" bids 205 of profiles 231-233. For each successive "B" lead in matched bundle 225b, the instantiated auctioneer 226 tests the supplied bids 205 looking for the highest, exclusive bid (if any) and/or for the revenue-maximizing set of nonexclusive bids (if any) and picks the exclusive or nonexclusive option that maximizes revenue for that lead. In one embodiment, the highest two nonexclusive bids are used to define the revenue-maximizing set of nonexclusive bids. In a second embodiment, the highest four nonexclusive bids are used to define the revenue-maximizing set of nonexclusive bids. Other limited numbers (i.e., in the range 2-10) of the highest nonexclusive bids may instead be used to define the revenue-maximizing set of nonexclusive bids.

Although not shown, in one embodiment each bidding profile (i.e., 231) may specify one or both of a maximum number of leads to be accepted over a prespecified time period (e.g., a geographically local 8 hour period) and/or a maximum amount of money to be spent on leads during the same or another prespecified time period. As maximums are hit for various ones of the "B" profiles 231-233, the maxed-out profiles fall out of the bidding battle (they are deactivated) and next successive leads are bid for by the remaining profiles. In one embodiment, this first-in, first out approach provides incentive for lead sellers to stream their leads in according to corresponding time zones of bidders around the globe because the early bird in each time zone will probably mate with the highest bids. Daily purchase caps of lead buyers are specific to the time zones of the buyer. Specified purchase limits of buyers need not be set on a per local day basis. They can be set for other time spans such as per local week or per hour according to the desires and lead-handling bandwidths of specific buyers.

In one embodiment, even after a given highest exclusive bidder has won a corresponding lead or a revenue maximizing set of nonexclusive bids has outbid the exclusive bidders for, and thus won that lead, the price paid for the corresponding lead may be down-adjusted to be less than the winning bid amount. Such selective discounting may be carried out by the illustrated price setting mechanism 227 coupled to auctioneer 226. Discounting may occur if a quality feedback feature is active and the seller of the corresponding lead has earned a poor rating based on earlier sold leads. The poorly-rated seller is, in essence, forced to pay back to the seller group 230 for having earlier sold inferior leads (leads that are rated by a sampled subset of buyers as being comparatively inferior). The price setter 227 automatically forwards a credit for the set price to the seller of the auctioned lead. It also instructs the auctioneer 226 to automatically deliver 228 the auctioned lead to the winning one exclusive bidder (i.e., B1) or the winning subset of nonexclusive bidders (i.e. B2-B3) in that auction bin. In one embodiment, sellers are blocked from cashing out their credits until a predefined, dispute resolution period lapses.

In one embodiment, the discount factor is normalized as 0% discount for sellers rated as being in the top 25% based on the seller-rated qualities of their earlier-offered leads. The remaining 75% of sellers are banded into discounts ranging from 5% to 75% markdown. (No seller gets a 100% or greater markdown.) By way of example, assume the bid matching engine has decided that an exclusive bid, A5 (not shown) of $100 is the winner. The price setter 227 however privately determines that the seller belongs to the 50% markdown band due to previous ratings from trusted and/or randomly selected sellers. The winning amount is therefore marked down by the markdown factor to arrive at a charge to the winning buyer of just $50 for that lead—the reason being that the lead came from a less than stellar seller (one not in the 0% markdown band). An accounting engine (not shown in FIG. 2) then credit's the buyer's account by roughly that $50 amount, and debits the seller's account by roughly that amount, the more exact amount being the settlement price minus a small commission (i.e. $1) that flows to operator of the leads-and-bids exchange system 200. There is no settlement situation or separate accounting for the discount. In one embodiment, sellers are blocked from cashing in their currently awarded credits until after a predefined dispute resolution period passes. During that delay time, the operator of the leads-and-bids exchange system 200 may determine that a given seller is not eligible to get paid because the sold leads where fraudulent. In one embodiment, the dispute resolution period is seven days.

Aside from providing a quality markdown for leads offered by an inferior seller, the price setter 227 of one embodiment also includes a highest-bidder discount mechanism (i.e. a novice-buyer discount mechanism). This prevents a novice or accidentally mistaken bidder among a group of more seasoned or less erroneous bidders from unknowingly bidding too high (way above market price). For example, in a shared lead scenario, the price setter 227 might deem it unfair that the four winners are paying substantially different prices for the same lead and might reduce the price charged to the highest of the four winners, for example lowering it to the same level as that of the lowest winner in the winning group. In another embodiment the price setter 227 may reduce the highest of a winning set of nonexclusive bids down to the average of the original winning bid set or to the average of the other winners in the set.

Considering now, the more complex case of the "AB" overlap zone 234, the correspondingly instantiated auctioneer (not shown) scans all the "A" profiles 235-237 and all the "B" profiles 231-233 as well as the matching "C" profiles (204) to find the highest exclusive bidder or the revenue maximizing, but limited subset of nonexclusive bidders for each successive lead in the "AB" matching bundle 225*c*. It is often advantageous to sellers under this system to provide leads that match with as many of the submitted profiles (A, B and C) as possible so that their leads will receive the highest one or combination of bids. The system indirectly encourages sellers 224 to meet the profiled demands of the lead buyers 230. The system encourages lead buyers to fine tune their profiles 231-233, 234, 235-237 so as to mate with incoming leads that provide best value for the corresponding bid amounts 203, 204, 205. The system may be operated in a semi-publicized or semi-open manner so that lead sellers can easily discover what profiles (but not which buyers) are offering the highest bids and lead buyers can discover what leads (but not which sellers) are receiving the lowest and highest bids. Each side may tailor its bid and offer strategies accordingly.

Referring to FIG. 3, in one embodiment, the on-the-fly segmentation data assembling means is incorporated into an automated leads auctioning system 300 such as the kind disclosed in the above cited, U.S. Ser. No. 11/207,571 (System for Implementing Automated Open Market Auctioning of Leads). The more notable feature of FIG. 3 is the inclusion of the array of classification nodes 341 (corresponding to 41 of FIG. 1A) and their coupling to IVR unit 345 (corresponding to 45 of FIG. 1A). Coupling 345*b* (corresponding to 45*b* of FIG. 1A) forwards lead segmentation data into storage 330 by way of data gathering unit 320. Coupling 344*d* (corresponding to 44*d* of FIG. 1A) conveys signals identifying missing segmentation data back to the IVR unit 345 so the IVR unit can attempt to collect the missing segmentation data. Voice switchbox 316 manages automated callbacks (349) to consumers and call forwarding to lead buyers. Additionally, the system 300 includes an instant survey engine 390 which is operatively coupled (392) to live telecommunications pathways 355*b* and also operatively coupled (391) to a quality rating database 357 so that instant surveys may be taken of lead buyers after the consumer hangs up. In one embodiment the instant survey results are used to rate the associated promoters (sponsors) of respective hot leads so that the system can quickly adjust compensation based on lead quality. Many other aspects of the present FIG. 3 correspond to like numbered elements of FIG. 4A of said U.S. Ser. No. 11/207,571 which is incorporated herein by reference.

In the illustrated schematic block diagram of the seekers-to-leads matching system 300, lead sellers (promoters) are understood to be supplying their information from the left while potential lead buyers supply their information from the right. Sellers may use various, seller-side interface devices 310 for communicating with a core portion 350 of the system 300. Buyers may use various, buyer-side interface devices 380 for communicating with the core portion 350. System features used in the seller-side interface devices 310 will often differ from those used in the buyer-side interface devices 380 since the two groups of system users have different goals. However, it may be advantageous to provide integrated buy-and-sell software to all users, installed in their respective interface devices (310 and 380), and let them decide when they want to operate as buyers and when as sellers of leads for various products.

Some types of sellers rely on so-called Internet portals 311 for attracting large numbers of prospective consumers 308 to their web sites so as engage the attracted visitors with the possibility of converting their visits into generated leads for various, sponsoring products. In one embodiment, the portal web sites will include banner ads with enticements such as shown at 32*a* of FIG. 1A (e.g., Click here if you need product X or service Y). The enticements will direct consumers to call respective nodes of telecommunications array 341 where each active node is associated with a corresponding promoter ID and/or product ID and/or geographic locator. Corresponding segmentation data is coupled through link 345*b* to be combined with additional segmentation data, if any, that is collected via on-line web forms. In addition to consumer attracting portal sites 311, some types of sellers may provide ISP service sites 312 with similar enticement features that attract large numbers of prospective consumers, induce the visitors to call into array 341 or to provide their number and receive a callback 349 from unit 316 with either approach seeking to engage the site visitors and to convert their visits into hot leads. Examples of other prospect attracting mechanisms include but are not limited to: provision of free search engine services 313 where sponsored results are listed prominently and with the call-in (32*b*) or callback (32*c*) inducements, web directories where sponsored results are listed prominently, special content sites and so forth. Leads might also be generated and captured in automated and/or manually operated telephone call centers 317 and/or by regular mail solicitations that include the call-in (32*b*) inducements.

FIG. 3 shows the interactive automated call processing unit at 345 and a manual call processing center at 317. Each of the automated and manual call processing means (345, 317) couples to the automated call-forwarding and callback unit 316. After pre-screening and on-the-fly collection of segmentation data, hot connection phone conversations may be placed momentarily on hold by either of the respective automated and manual call processing means (345, 317) and then forwarded with no apparent interruption of connection to a lead buyer by way of the automated call switching unit 316 and forwarding connection 318 (which couples to the public telephone network and/or the internet). Although not explicitly shown, link 317*a* is understood to convey manually collected segmentation data to assembly unit 320. The manually collected segmentation data can be a substitute for or a supplement for further segmentation data collected by the IVR 345 and transferred by coupling 345*b* into assembly unit 320. Instant survey engine 390 is coupled so as to be able to operatively couple (392) into a live telecommunications channel portion 355*b*-355*b*' of the system for automatically detecting interaction termination between consumer and vendor and for responsively presenting a pre-formulated instant survey proposal to randomly selected vendors and for collecting hot-ranking response data from that queried vendors. Bus 355*b*' further couples to a so-called, leads delivery engine 355 which will be explained below. The leads delivery engine 355 can direct the automated call forwarding unit 316 to direct a given one of plural incoming calls for forwarding through connection 318 to a winning bidder of an automated auction carried out in core portion 350.

In the system 300 of FIG. 3, automated lead inducing programs may run in the various lead-capturing environments 311-313, 345 for controlling the lead capture process. These programs may be under joint control of registered sponsors and the operator of the core matching system 300. For example, in the automated call processing unit 345, a first interactive voice recognition (IVR) process may run for allowing a prospective consumer to respond with touch tone and/or voice responses to predefined question sequences generated by an IVR process selected by a corresponding sponsor and based on how the sponsor induced that consumer to call into array 341. The sponsor selected IVR script will cause the IVR subsystem to collect additional information from the in-calling consumer and to generate corresponding digitized lead segmentation data based one the responses provided by the prospective consumer. (Other terms for IVR may include VRU—voice recognition units, ISR-interactive speech recognition and so forth. The units may include automated dialers as well as automated voice interface with prospective consumers.) The IVR process may be encoded to include a CallXML™ or CCXML interface (where CCXML is an industry standard Extensible Markup Language or XML that is directed to providing telephony interface between human user and machine and CallXML™ is a private brand variation) or it may be encoded to include a VoiceXML™ interface (another variation) or any other appropriate, semantically tagged or other man-machine interface. In one embodiment, each registered sponsor can log in via private connection channel 314, internet interface 320 (which interface 320 also functions as the segmentation data assembly unit) and connection path 314*a* so as to uniquely program the IVR scripts held in unit 345 for the nodes in array 341 that are assigned to that registered sponsor. In this way the registered sponsor can custom tailor the voice interactions of his drawn-in consumers to match with external promotional activities (e.g., 311-313).

The digitized lead data which is generated by the IVR is forwarded via lead processing path 345*b* to lead data receiving and assembling unit 230 while the call itself (analog or digital) is momentarily placed on hold along intermediate bus 316*a*. Shortly afterwards, switching unit 316 forwards the on-hold call to a winning bidder (winning lead buyer) and the winning bidder picks up the transferred hot connection call and continues manual conversation and/or continued automated IVR processing with the on-line prospective consumer as may be appropriate. In similar manner, digitized lead segmentation data generated by a manual call processing center such as 317 are forwarded by path 317*a* to system core 350 while the on-hold call feeds to the automated call forwarding unit 316 by way of path 316*b*. The manual telephone operator in center 317 may tell the prospective consumer, "hold on one second while I transfer you to one of our specialists" and then unit 316 forwards the on-hold call to a winning bidder as selected by the exchange core system 350 (by a winner selector 354 within the core) based on segmentation data provided on line 317*a*. The winning bidder picks up the transferred hot connection call and continues with manual conversation and/or automated IVR processing with the on-line prospective consumer as may be appropriate.

Before a winner is selected though, the automated call processing (IVR) unit 345 alone and/or with the help of others of the lead various lead-data capturing mechanisms 311-313, 317 will have transferred their captured lead segmentation data signals to the system core 350 by way of appropriate, seller-side communication mechanisms 320. Examples of communication mechanisms that may be used for gathering segmentation data include TCP/IP or similar networking protocols in general, HTTP based interfaces, SMTP or other email interfaces such as SMS, FTP or other data transfer protocols, Web Service protocols such as SOAP and so forth. Sellers may control their respective lead attracting and segmentation data gathering mechanisms 311-313 from respective seller control terminals 305. Alternatively or additionally, sellers may couple their control terminals 305 to the core 350 by way of various private connections 314 (wired or wireless).

While most of the data flowing from the sellers' interface devices 305-310 into the core portion 350 of the system comes in the form of digitized leads or lead specifications and/or hot connected voice links, one kind of data that may flow back from the core 350 to the sellers' interface devices 310 comes in the form of lead-processing feedback factors. These lead-processing feedback factors may include error and status indicating codes, indicators of the amounts of monies earned by the seller for one or more sold leads, and other quality feedback items 306 as will be detailed below. The seller-side interface devices 310 (or seller/buyer integrated software) are accordingly configured to not only produce lead data (classifiable lead descriptor data) for processing by the core 350 and matching to profiles of lead seekers; but also to receive and/or display the final-adjusted price credited to the seller's account for one or more given sales of a corresponding one or more leads and/or quality feedback items 306 received from the core 350 (including returned and disputed leads that had been bought). The feedback adjusted price and/or quality feedback items 306 do not generally appear on public portions of the seller's public attractor sites 311-313 but rather on private regions of the sellers' respective control terminals 305.

Block 330 represents a first core storage area where incoming lead segmentation data are received and stored. Receipt and storage of leads may be optionally confirmed back to the sellers' respective control terminals 305 via the seller-side communication channels 320. A completeness tester 344 is included in storage unit 330 for verifying that the stored segmentation data packages are not missing any vital data for purposes of carrying out matching of leads to lead seeker profiles. If vital match data in a given lead package (L1, L2, . . . , Ln) is found to be missing, unit 344 identifies the missing data via link 344d to the IVR unit 345. In one embodiment, this activates an appropriate IVR script for gathering the missing data from a still-on-line potential consumer. The lead package will not be forwarded to match-maker unit 352 until it is complete with respect to vital data needed for proper matching (e.g., product identification, price range identification, etc.). Of course, lead data packages (L1, L2, . . . , Ln) may contain nonvital optional data that is not necessary for purposes of match making but instead may facilitate the closing of a deal. The missing data lookup unit 344 is programmable to adjustably define what missing data is vital and what is not vital.

After receipt and completion of each lead data package (L1, L2, . . . , Ln), the data is automatically further processed by a validity verifier 351 to assure that the collected lead data appears to be legitimate. Automated validity verification may include pinging email or other addresses provided in the received lead data package (e.g., 331) to verify that given addresses are legitimate. Validated lead packages are then assigned unique lead identifications (Lead ID's).

The validated and uniquely identified lead packages are next sent to the classifying-and-match-making unit 352. In one embodiment, each lead is mated to as many of the available and active buyer-profiles 353 in the system whose requirements (lead specifications) that lead can validly satisfy. Exact matching is not always necessary. In some embodiments, less than full matching of leads to buyer-profile specifications is allowed (providing the bidder authorizes it) and the bidder of a less than fully matched profile is awarded a discount if his bid wins in the competition for the lead.

Competition for the validated and matched lead occurs in unit 354. There, a bidding contest or auction is conducted and a winning bidder is selected. The ID's of the sold leads and the ID's of the winning bidders are sent to a delivery engine 355 so that sold leads are removed from the first storage area 330 and transferred for delivery according to the wishes of the winning bidder(s). In one embodiment, lead signals 355a provided to the delivery engine 355 include contact and/or qualification information about their corresponding potential customers (potential parties for a multi-party interaction, where the other parties will be one or more lead-buyers). In one embodiment, the qualification information indicates a qualification (e.g., income range, geographic location, motivation to close a deal in defined time span) of the corresponding party to participate in the interaction.

The illustrated, second storage area 490 of core 350 contains the activated and competing bid profiles (P1, P2, . . . , Pm). Each of these bid profiles (e.g., 491) came into being within storage area 490 as a result of buyer/seeker data sent by way of transmission channels 370. The transmitted buyer data can include one or more of the actual data for the bid profiles (P1, P2, . . . , Pm) or instructions for specifying what information is to be stored in, associated with, or activated within the seeker/buyer's bid profile (e.g., 491). As in the case of the seller-side transmission channels, the buyer-side channels 370 may include accommodations for communication mechanisms such as TCP/IP in general, HTTP based interfaces, SMTP or other email interfaces, FTP or other data transfer protocols, Web Service protocols such as XML based content and so forth. Channels 320 and 370 may be partially or fully integrated with one another. It is quite possible for some system users to function during a given day both as buyers and sellers or resellers of leads.

When a given lead is purchased by a buyer, it does not always have to be immediately delivered into the buyer's possession. For example, if a potential consumer instructed IVR unit 345 that this consumer wants to speak 'Later' with a matched operator rather then now, then the callback unit 316 may initiate a callback some 10 to 30 minutes later for example, automatically verify that the consumer is now ready to speak and at that time connect the winning lead bidder into hot contact line with the potential consumer for further interaction. Identifications of acquired leads can accumulate in delivery engine 355 for a specified period of time and can thereafter be batch delivered to the appropriate exclusive buyer or appropriate set of sharing buyers and/or their designated agents. The three schematic arrows of item 355a represent a batchable set of lead data that can be stored and delivered to the appropriate buyers (or their agents) at a substantially later time rather than the time of purchase. In one embodiment, the delivery engine 355 keeps track of the aging of deliverable leads it has stacked in its memory and delivery is initiated ahead of schedule if some leads age beyond a predefined threshold.

In some instances—especially hot contact situations where the consumer indicates he or she is ready now to speak to an operator—delivery of leads should not be delayed by more than a very small amount of time (i.e. 0.1 minutes to 3 minutes, or less) because the lead constitutes a "hot connection," meaning that the prospective consumer is currently in the right frame of mind and is waiting on a telephone line (e.g., on lines 316a or 316b) or on another live communications means (e.g., instant messaging link) and the lead buyer needs to take over (via call transfer, forwarding, etc.) control of that "hot connection" relatively quickly (i.e., within 500 milliseconds) so that the consumer does not become annoyed with waiting tool long. Item 355b represents such a live communication. The delivery engine 355 of one embodiment includes means for differentiating between sold leads that include hot connections or not, and for prioritizing different kinds of leads according to their aging (if appropriate) and urgency for immediate delivery. Accordingly, if a seller has had a prospective consumer on hold, on line 316a (for example) for a long time and another, non-hot lead (e.g., in group 355a) is sold first, the delivery engine 355 may include means for prioritizing the hot connection lead 355b as requiring delivery first and for accordingly delivering lead 255b soon after a corresponding buyer has purchased that hot connection lead 355b. In general, hot connection leads such as live or on-hold phone calls (or ongoing web chats) should be sold and transferred to the lead buyer as soon as practical (e.g., within less than 2 seconds of their initial capture and offer to sell). Connection 355b carries the transfer instructions for live or hot communications. The automated call forwarding/call back unit 316 discussed above is an example of a means for redirecting a hot communication to a winning bidder. Hot communications may include callback versions where the consumer has entered his phone number into area 32c of FIG. 1A and filled in a web form and now the processing center 40 is calling the consumer back with a winning lead buyer present on the other end (60) of the telephone callback connection (39, 349).

After a given buyer (say B4 of user device group 380) has received delivery of a paid-for lead and has tried to convert the lead into a deal closure, the given buyer (B4) may discover that the purchased lead is defective in some way. In accordance with one embodiment, the buyer's interface device (e.g., B4) includes quality-of-lead descriptor means (QOL 385) for allowing the buyer to immediately indicate what one or more defects the buyer found in the purchased lead (e.g., a hot lead). In one embodiment, the quality-of-lead descriptor means (QOL 385) supports both instant survey-takings and longer-form non-instant survey-takings.

In the case of instant survey-takings, engine 390 (instant survey engine) automatically detects a termination of interaction between the prospective consumer and the buyer. The instant survey-takings engine 390 uses a statistically appropriate sampling method to pick which lead buyers will receive an instant survey proposal where they are asked to instantly rate the lead they just processed. For those of the hot-connection buyers which the engine 390 picks as samples, the engine keeps the connection 355b going (even if it means re-ringing the buyer) and the engine presents the instant survey proposal to the buyer via one or more presentation means. The survey proposal presentation means may include an auditory presentation device such as the lead buyer's telephone receiver. Alternatively or additionally, the survey proposal presentation means may include a visual and/or other presentation device that may be integrated into the buyer's interface device (e.g., B4). For example, at the same time that the instant survey engine interjects a "Please take a moment" pitch for play through the buyer's telephone receiver, a flashing pop-up menu may appear on the buyer's computer screen to reinforce and/or validate the request. If the buyer says, No thanks, or hangs up, the pop-up menu quickly disappears and the engine 390 accepts the refusal as a non-responding sample point in the survey process. If the buyer instead responds by pressing an appropriate touch-tone key or speaking a suggested voice response or taking other response action as may be proposed visually through the pop-up menu (not shown) on the buyer's computer screen, the engine 390 collects the hot response information by way of path 393 together with the buyer's identification information (buyer ID) for storage in the quality rating database unit 357. The corresponding lead ID and seller's ID are collected via path 332 for logical linking with the hot response 393.

Quality rating database 357 collects instant survey responses and older types of QOL ratings data from various users of the system and processes these according to empirically developed evaluation algorithms to arrive at weighted decisions regarding what rating (394) each promoter/seller should receive in view of his recently rated performance for delivering good leads. Sellers who provide highly-rated leads will generally receive high feedback ratings (applause) from the sampled buyer community while sellers who provide poorly-rated leads will generally receive low feedback ratings (boos) from the sampled buyer community. The generated ratings signals 394 will reflect this feedback (e.g., 393) from the sampled buyer community.

As explained above, the QOL data 385 generated by buyers such as from buyer telecommunication device 84 is fedback along path 393. The fedback quality data may include one or more of a lead identifier, a buyer's hot and/or cold rating(s) of the lead quality (e.g., wrong callback tel. number) and an indication of whether the lead converted into a close or not.

The fedback QOL data 385 may include an indication of how aged the feedback is relative to termination of contact with the consumer, i.e., is it a hot ranking or is it a cold ranking that was made after the emotional heat of the interaction and the immediate recollection of it has faded. Other buyers (e.g., B1, B2, B3) will have similar QOL means installed in their interface devices and will be able to send back similar lead feedback data along respective pathways similar to 393. In one embodiment, not all buyers are empowered to return lead feedback data and/or the returned data of only of arbitrarily or selectively picked buyers is used in the receiving, quality rating database 357. Thus buyers do not know whose feedback data is being used or not to generate group ratings and the buyers cannot easily game the system. In one embodiment, the manager of the bids-and-leads processing system 300 decides which buyers are trusted ones whose feedback is to be always used by rater 357 (if sampled by the rater) for generating group ratings and/or which buyers are untrustworthy such that their feedback is to be never used by the rater 257 (even if sampled by the instant survey engine 390) for generating such group ratings. In one embodiment, only a subset of processed leads is rated, where the rated subset is sufficiently large to get a statistically significant rating of the corresponding seller's leads quality.

Depending on context, seller ID's may or may not be hidden from the corresponding buyers before and/or after bidding. In one embodiment, after receiving the lead—seller identity is initially hidden from bidders at bidding time, but after purchase, the purchased lead may reveal to the buyer information about how the lead was generated. In other words, it is generally (but not always) desirable to hide the seller ID from intermediary re-sellers,—but sometimes revealing the identity of the lead seller to the ultimate buyer can assist the ultimate lead buyer with the closing of the lead (converting the lead), for example by enabling the buyer to indicate to the prospective consumer, where, when, and/or with whom the consumer first interacted when they gave out their contact and/or other information. Even in cases where seller ID's are always hidden from buyers, the quality rating database 357 has access to the linkage between seller identifications and lead identifications (e.g., through path 332) as well as to the feedback information provided by the buyers. The quality rating database 357 produces on line 394, a seller quality indication signal which is supplied to discounting engine 358. Since the quality indication signal 394 can include an indication derived from the taking of instant surveys, such a quality indication signal 394 can allow the system 300 to respond fairly quickly to new sellers who engage with the system and begin to provide hot leads of varying quality to the buyer community.

In one embodiment, the price-setting/discounting engine 358 may be optionally deactivated so that sellers receive the full amount of each bid contest 354. When deactivated, the auction or bid settlement price 354a (received from unit 354) simply becomes the adjusted price 349. When the price-setting/discounting engine 358 is active however, the discounting engine 358 can reduce actual auction/bid settlement prices 354a by a number of factors, including for example, the seller markdown amount calculated from the seller quality indication signal 394. This seller markdown factor can be calculated on a per-seller basis or on a per-seller's-leads-sourcing account basis (a given seller might have different sources of leads with different qualities). The markdown factor can also be made a function of lead-contained data and historical performance—so that markdown is to some extent computed on a per-lead basis. Different algorithms may be devised for the rate of reduction as may be appropriate depending on a variety of parameters, including but not limited to: feedback from actual consumers into the system, feedback from intermediary system operators (i.e., manual validators as they perform manual screening of various leads), feedback from sellers regarding product, product price range, selling season, volume of leads and so forth. A high quality seller may receive 100% of the settled auction or bid price 354a (in other words a 0% markdown) while a medium quality seller may receive 80% and a poor quality seller may receive only 40%. The system rewards high quality sellers more so than poor quality sellers and can do so relatively quickly thanks to the inclusion of the instant survey engine 390. The adjusted lead price 349 that is credited to the seller's account is also debited (via coupling 396) from the corresponding buyer's account so that the buyer pays less for leads won from poor quality sellers. The seller interface devices 310 may include display means for displaying privately to the sellers (e.g., on terminals 305) what the adjusted price was, or what the downward adjustment percentage was in a given time period. More detailed quality feedback data may also be sent back for display on sellers interface devices 310 such as average buyer rating by multiple buyers for that seller and/or average buyer closing rate for leads sold by that seller. The seller may then adjust his or her behavior and/or promotion schemes (21 of FIG. 1A) accordingly. Since the instant survey engine 390 is present, sellers can receive fairly current rating information and can take corrective action relatively quickly if one of their promotional schemes is producing poorly-rated leads and ruining the seller's reputation. Billing engine 359 couples by path 397 to the buyer devices 380 so that buyers can run database queries on how much they have spent for purchasing leads. More generally, a reports engine 356 may be provided in the system for generating database reports on allowed data for each of the seller and buyer groups. Path 356a connects to the sellers. Path 356b connects to the buyers. Buyers are blocked from seeing seller identifications. (Otherwise they might try to bypass the exchange system core 350 and deal with the sellers directly after having gained benefit of the core's production of seller ratings 394.) Sellers are blocked from seeing bid profiles 490. (Otherwise such sellers might try to limit the extent of their offerings and target only the highest priced bids.)

In one embodiment, the leads offer-and-buy exchange system 300 maintains a historical database of each seller's recent and past performance over a time period of predetermined length and penalizes the seller to some extent if the seller exhibited poor lead quality in that time period. One algorithm for evaluating a given seller's past performance normalizes the given seller's closure rate (the percentage of leads that culminated in closed deals during the evaluation period) against the average closure rate of a top X % by volume of a representative sampled subset of all sellers using the system and engaged in that product line, where X % is a predetermined factor such as 5%, 10%, or 25%. The system however rewards the seller if the current lead exhibits characteristics that make the one lead better than average leads offered by the seller. For example, in one embodiment the exchange system 300, maintains a historical database of known customer past performances over a recent time period of predetermined length and rewards the seller to some extent if the current lead points to a prospective consumer of known good consuming activity in the predefined time period. Conversely, the system can penalize a generally good seller if the consumer to which the current lead points has known bad consuming activities in the predefined time period. A generalized algorithm for price adjustment may take on the following form:

$$\text{Price Discount rate} = a * \text{SellerAccountDiscountRate} + b * \text{CurrentLeadDiscountRate}$$

where a and b are predetermined weighting coefficients for the given product line, where Seller_Account_Discount_Rate is a variable that can be positive or negative and is based on historic data such as closing rate of this seller's account versus accounts of the best known lead sources, and where Current_Lead_Discount_Rate is a variable that can be positive or negative and is based on of specifics of the offered lead such as for example, reducing the Price Discount Rate to as low as 0% due to the fact that the pointed-to customer is a repeat customer who recently bought a different product and is therefore highly likely to buy the current product. One the other hand, for some products, if the pointed-to customer is a repeat customer who recently bought the same product, that might be a factor that penalizes the seller by increasing the Price Discount Rate. The algorithm can have many more weighted variables and the operations of each may vary from product line to product line as well as between different classes of leads (high quality leads versus lower band ones).

In one embodiment, when new promoters (lead sellers) register into the system and load their respective IVR scripts into unit 345; they allowed to privately test the system before going live and online. Sellers may privately test their various interfaces with so-called test leads. In one embodiment, each lead data structure includes a test-lead indicator for indicating that it is a test lead rather than a live lead (or a live lead indicator which indicates the vise versa case). Test leads are not routed by the system (e.g., 300) for actual bidding against by in-system profiles within box 352 for example. By contrast, nontest, offered leads do flow into box 352 after validation. Instead test leads are filtered out of the flow after having run through the validation and/or acceptance rating box 351. The seller can pretend to be a consumer and call into his assigned node of array 341 as a test hot lead to see how the system treats him in response to various permutations of consumer answers given to IVR unit 345. In this way the seller can debug his part of the system before going live with real promotions. It is within the contemplation of the disclosure to provide other flow control test indicators within inbound leads beyond just those requesting a validate-and-ignore treatment for dummy leads. For example, a seller may wish to find out if his test leads match up with existing bid profiles while not yet submitting those leads for live bidding. In one embodiment, each lead data structure includes a match-but-don't-sell indicator for indicating that it is a match-testing lead only rather than a live lead. In-lead indicators may request both validation and match verification or other combinations of non-binding interactions with the system (i.e. a hypothetical test of estimated revenue streaming without actually selling the leads). In one embodiment, each lead data structure includes custom lead-tracking indicator which triggers a report back to an authorized seler of where his offered and/or sold lead currently resides within the system and what it's state is (i.e., is a reputable buyer now busy converting the sold lead into a deal closure?). There are instances where sellers want to assure that the consumers found by the sellers are being promptly and properly serviced by the exchange system and by the winning buyer at the other end. Such custom tracking flags allow them to monitor what is happening with specific ones of their leads.

Just as sellers can run dummy leads into the system for test purposes, in one embodiment, buyers may similarly test the operational integrity of the lead delivery engine (355) by asking the system to feed the buyers with one or more dummy leads (ones which the buyers do not pay for and which have dummy lead information provided in them). If the requested dummy leads correspondingly show up on the buyer's interface device (380) within a specified time period, the buyers can conclude that the delivery engine (355) and their interface device (380) are working properly and at the desired delivery speed. Thus, the system provides integrity verification for sellers and buyers to help them assure that their respective interface devices are still operatively interconnected to the exchange system.

In the leads exchange environment, the desires of at least three different kinds of participants should be satisfied in order to maintain a viable, automated marketplace: consumers, lead promoters/sellers and lead seekers/buyers. The experience is reviewed at least from the perspective of the product consumer who is trying to be connected to a vendor of a given product:

Process for Consumer:

In a first step (consumer.1), the consumer fills out a template or form that is hosted on the seller's website. Alternatively, the consumer provides information about himself and his desires to customer service representative who is reached at intermediary node 37 (FIG. 1A) where the customer service representative works for the lead-sourcing and lead selling company. The customer service representative then enters at least some of the needed information for completing an SD package into a digitized form or template and forwards the call an appropriate classification node such as 41a of array 41 where the call processing center then takes over management of the forwarded call. The contents of the to-be-filled-in forms or templates may vary on a product by product basis. Alternatively, the consumer dials into a specific seeded telephone number such as represented at 32b of FIG. 1A and this specific telephone number inherently provides segmentation information regarding the type of product the consumer is looking for and regarding the identification of the promoter/lead-seller. An IVR unit such as 45 (FIG. 1A) or 345 (FIG. 3) then automatically interrogates the consumer for missing segmentation information so that a corresponding lead segmentation data package can be completed, assembled and sent to the matching unit 47.

In a second step (consumer.2), the assembled segmentation data package signal is quickly transferred to the leads-and-seekers matching system (47). The matching system may include an auctioning function but does not have to. The consumer will generally be unaware that matching occurred or that the lead may have been sold to a highest matching bidder in an open market system. The point is that the segmented lead data is quickly matched with a corresponding lead seeker (e.g., the highest exclusive bid in an auction) so as to quickly meet the needs of the inquiring consumer. The consumer will be on hold on the telephone line or on another hot connection for only a short time (e.g., less than a minute) and need not be aware that the automated matching process is taking place or how all of the segmentation data was collected.

In a third step (consumer.3), the lead data is quickly transferred to the matched lead seeker/buyer and the live voice connection is forwarded to the matched lead seeker/buyer so that the seeker/buyer can interact live with the consumer.

In a fourth step (consumer.4), the lead buyer continues contact with the consumer (or re-establishes contact via callback) and attempts to close a sale. In the hot contact scenario, because steps 2-3 happened so quickly, the prospective consumer is essentially unaware that his or her information was bid on and purchased by a relatively highest motivated one of competing lead buyers.

Process for Lead Seller:

In a first step (seller.1), the lead offeror fills out an online template indicating the segmentation data class to which belong consumers who reach a given web page (e.g., 32a) among the seller's multiple sites or who respond to a particular billboard ad placed by the seller. The seller submits the template to module 43 of the call center 43 and receives back either a static, special phone number to insert into corresponding space 32b of the sellers given web page or into corresponding space on the seller's billboard (print media) or a dynamically replaceable code which the centers assigning module 43 will fill in for each respective consumer that visits the sellers given web page. In the dynamic assignment scenario, the call center assigning module can control voice traffic flow by dynamically routing callers to different physically-separated ones of nodes in array 41 even though the segmentation data is the same; this assuring that the corresponding physical media layer of a given one node (e.g., 41a) does not get swamped with too many calls at once. By distributing inbound calls among different physical circuits (e.g., line cards) the dynamic assignor can smooth the traffic flow through the physical circuits. Also the dynamic assignment scenario can smooth out traffic flow to different subsets of vendors by distributively employing different seed numbers so as to reduce chances that any one vendor will be swamped with more calls at once than that vendor can handle.

In a second step (seller.2), prior to going live on the internet (25) the lead seller tests the seeded contact number (e.g., telephone number) with a stream of dummy consumer inquiries to make sure the connection and software are working as expected. The seller can signal to the call center regarding which of the seller's nodes are to now be considered live and providing real potential consumers as opposed to which are still in dummy test mode. In response, the call processing center matches dummy consumer calls with dummy vendor pick-ups rather than real lead sales so that the seller can test out the full consumer experience before going live.

In a third step (seller.3), the seller makes his given web site (e.g., 32a) or other promotional material (e.g., billboard) publicly available, for example over the Internet 25 and consumer traffic begins to trickle in. Thanks to the static or dynamic redirection to a classifying node such as 41a; which redirection was seeded in (23) by the assigning module 43, consumer inquiries from that given web site or other promotional inducer are redirected to the appropriate classifying node (e.g., 41a) and vendors matching the qualifications of the corresponding segmentation data (46b) are found and paired up with the responding consumers. In one embodiment, the seller can rely on the call center 40 for finding the optimal vendors (and highest sale price) for his offered leads (36) because matching unit 47 of that embodiment is generally auctioning off the leads to the highest bidders. (A small portion of leads are intentionally sold on a random basis to less than highest bidders so that one well-heeled bidder cannot freeze out all other bidders completely and thus game the system.) Since the call processing center 40 is taking care of the problems of finding the best available prices for the seller's leads and making sure that calling-in consumers are getting quick, courteous treatment (because the highest-bidding lead buyer generally does not want to destroy the value of his just bought lead by being discourteous), the lead seller can focus his or her energies on improving the way the seller's consumer-attracting web site (32a, 32b, 32c) and/or other promotional material attracts the right kinds of potential consumers. Everyone wins from this process because the promoter (20) does what he does best in inducing more and more potential consumers to call in into the call processing center 40. The call processing center 40 gives each in-calling consumer (30) quick service without repeating unnecessary questions. Potential vendors get a greater influx of quality consumer inquiries over which to bid. Lead sellers of high quality leads receive greater compensation for their lead finding efforts (21) once a satisfied population of lead buyers 60 is established.

Process for Lead Buyer:

In a first step (buyer.1), the lead buyer fills out an online template (profile) indicating the segmentation class variables (e.g., range boundaries) to which belong the consumers to whom the lead buyer wants to talk. The lead buyer then activates his profile for time periods and/or traffic amounts he is willing to service.

In a second step (buyer.2), the lead buyer (e.g., 61) receives a telephone call 65 from the call processing center 40. Alternatively, the lead buyer calls into the center 40 to indicate that the buyer is ready to process a next among a batch of substantially similar leads the buyer purchased and a predictive dialer mechanism at the call processing center 40 finds the next available consumer in that batch of leads and connects the on-line and pre-matched vendor to the found, potential consumer. In one embodiment, the caller ID on the lead buyer's telephone (not shown) tells the lead buyer what classification node (e.g., 41*a*) the call is being carried through from and this tells the buyer what type of potential consumer (e.g., 30) the buyer is being connected to. Alternatively or additionally, segmentation data for the matched call is scrolled onto the buyer's computer screen as constituting a recently acquired lead. Alternatively or additionally, segmentation data for the matched call is transferred via a VOIP channel on which the consumer-to-vendor call itself is carried.

In a third step (buyer.3), the lead buyer uses the classification and/or segmentation data sent to him to help in continuing the contact with the hot-connected consumer so as to try and close on a deal.

In a fourth step (buyer.4) and on occasion, the lead buyer receives an automated hot-survey inquiry (390) from the call processing center 40 asking the lead buyer to rate the quality of the lead he just concluded conversation with. In this way the lead buyer is able to signal his satisfaction or dissatisfaction with the leads he has recently purchased. Operators of the call processing center 40 and/or lead sellers (20) can make corrections based on this essentially instant feedback information.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of example of modifications within the scope of this disclosure, seeding connection 23 of FIG. 1A is not the only way that that a voice call (e.g., 36 or 39) which is linked to a potential consumer 30 can be guided towards a classifying node such as 41*a*. Any of a variety of other techniques may be used for guiding pre-classified or partially pre-classified interconnect traffic (voice or instant messaging or other live telecommunications) to a segmentation data classifying node such as 41*a*. For example, rather than including item(s) 32*b* and/or 32*c* in the promoter's web site (a web page whose content is controlled and editable by the promoter), the promoter's web site may include a hyperlink to a web page controlled and editable by the operator of station 40. That operator's web site (not separately shown) then includes one or both of items 32*b* and/or 32*c* for associating a unique telecommunications node (e.g., 41*a*, 44*a*) with corresponding segmentation data and for inducing consumer voice or other live telecommunication traffic to flow through such a fully or partially pre-classifying node. In this alternate embodiment, the operator of station 40 has more immediate control over the content of this traffic directing web site (the operator's web site) and thus can more quickly change the classifying node(s) to which the consumer voice or other live telecommunication traffic will next flow through. This ability to dynamically alter the identity of the targeted classifying node (e.g., 41*a*, 44*a*)—and to dynamically alter the segmentation data pre-associated with the targeted classifying node—allows the operator of the station 40 (or an automated agent) to better control the flow of traffic to different nodes among array 41 and thus to smooth out traffic flow so that no one node is swamped with too much traffic and/or no one vendor (e.g., 61) is swamped with more traffic that that vendor can process at a given time. This ability to dynamically alter the identities of the targeted classifying nodes for each promotion channel and to dynamically alter the segmentation data pre-associated with the targeted classifying nodes also allows the operator of the station 40 (or an automated agent) to make better use of the finite number of receiving nodes in bank 41 and of their finite bandwidths. For example, if one type of promotional material (e.g., for home refinancing in the $300K-$500K loan amount bracket) is currently receiving a relatively large flow of inbound traffic while another type of promotional material (e.g., for home refinancing in the $2000K-$5000K loan amount bracket) is currently receiving a much smaller flow of interested potential consumers, then the operator of bank 41 can allocate more of the nodes to the high traffic business sector and a comparatively fewer number of the nodes to the business sector having the comparatively smaller flow of traffic.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer display screens, GUI organizations, computer program listings or art works or other works provided herein, and to trademark or trade dress rights that may be associated with coined terms or works of authorship provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed as new and desired to be protected is:

1. An apparatus, comprising:
a leads processing system computer including a plurality of telecommunication nodes, wherein each telecommunication node is associated with its own telephone number, the system computer configured to perform the acts of:
store bid profiles in a machine memory associated within the leads processing system each bid profile including specifications for desired leads and a bid, each bid profile associated with a corresponding lead buyer;
subsequent to the storage of the bid profiles, receive at a first one of telecommunication nodes a telephone call from a human caller;
identify lead data based upon the telephone number associated with the first one of the telecommunication nodes;
compare at least the identified lead data to the stored bid profiles;
responsive to the comparison of the identified lead data to the stored bid profiles, select a winning bid corresponding to a winning bid profile while the human caller continues with the telephone call; and
transfer the telephone call to the lead buyer corresponding to the winning bid profile.

2. The apparatus of claim 1, wherein the system computer is further configured to perform the acts of:
interactively receiving lead data from the human caller corresponding to a desired good or service responsive to a distribution of promotional materials to consumers, and wherein said promotional materials include promotional content posted on a web site accessible via a digital network, and wherein the interactively received lead data is used to select the telecommunication node.

3. The apparatus of claim 1, wherein the system computer is further configured to perform the acts of:
interactively receiving lead data from the human caller corresponding to a desired good or service responsive to a distribution of promotional materials to consumers, and wherein said promotional materials include emailed promotional content coupled to a price offering, and wherein the interactively provided lead data is used to select the telecommunication node.

4. The apparatus of claim 1, wherein the system computer is further configured to perform the acts of:
interactively receiving lead data from the human caller corresponding to a desired good or service responsive to a distribution of promotional materials to consumers, and wherein said promotional materials are included in publicly-accessible publications including billboards, magazines and newspapers, and wherein the interactively received lead data is used to select the telecommunication node.

5. The apparatus of claim 1, wherein the lead data comprise one or more of a promoter identification, a product or service identification, a scale of transaction indicator, a promotion channel identification, a customer rating, a geographic zone identifier, and a time-of-probable-closing indicator.

6. The apparatus of claim 1, wherein the lead data from the human caller is collected by navigating the human caller through a tree-organized set of web sites, at the end of which the human caller is enticed to participate by making the telephone call.

7. The apparatus of claim 1, wherein the system computer is further configured to:
receive feedback from the lead buyer regarding quality of leads transferred to the lead buyer; and
adjust a price of the lead based on the feedback received form the lead buyer.

8. The apparatus of claim 7, wherein the feedback includes a deal-closing rate and the price of the lead is adjusted based on the deal-closing rate.

9. The apparatus of claim 1, wherein the system computer is further configured to:
receive a phone number from the human caller; and
initiate the telephone call between the human caller and the lead buyer using the phone number.

10. The apparatus of claim 1, wherein the system computer is further configured to transfer the telephone call to an alternate lead buyer when the lead buyer is not available.

* * * * *